United States Patent
Karlsson et al.

(10) Patent No.: US 9,086,889 B2
(45) Date of Patent: Jul. 21, 2015

(54) REDUCING PIPELINE RESTART PENALTY

(75) Inventors: Martin Karlsson, San Francisco, CA (US); Sherman H. Yip, Sunnyvale, CA (US); Shailender Chaudhry, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1172 days.

(21) Appl. No.: 12/768,641

(22) Filed: Apr. 27, 2010

(65) Prior Publication Data
US 2011/0264862 A1    Oct. 27, 2011

(51) Int. Cl.
*G06F 9/38*    (2006.01)
*G06F 12/08*   (2006.01)

(52) U.S. Cl.
CPC ............ *G06F 9/3851* (2013.01); *G06F 9/3802* (2013.01); *G06F 9/3808* (2013.01); *G06F 9/3842* (2013.01); *G06F 9/3859* (2013.01); *G06F 9/3863* (2013.01); *G06F 12/0855* (2013.01)

(58) Field of Classification Search
CPC .... G06F 9/3808; G06F 9/3851; G06F 9/3842
USPC ................................................. 712/205–207
See application file for complete search history.

(56) References Cited

U.S. PATENT DOCUMENTS

| | | | |
|---|---|---|---|
| 5,170,476 A * | 12/1992 | Laakso et al. .................. | 711/140 |
| 6,044,220 A * | 3/2000  | Breternitz, Jr. ................ | 717/139 |
| 6,643,745 B1 * | 11/2003 | Palanca et al. ................. | 711/138 |
| 6,735,687 B1 * | 5/2004 | Kok ................................ | 712/215 |
| 7,188,234 B2 * | 3/2007 | Wu et al. ........................ | 712/225 |
| 7,373,482 B1 | 5/2008 | Spracklen et al. | |
| 7,571,304 B2 | 8/2009 | Chaudhry et al. | |
| 7,836,281 B1 * | 11/2010 | Tremblay et al. ............. | 712/220 |
| 2002/0055964 A1 * | 5/2002 | Luk et al. ....................... | 709/107 |
| 2004/0133769 A1 * | 7/2004 | Chaudhry et al. ............. | 712/233 |
| 2004/0148491 A1 * | 7/2004 | Damron ........................... | 712/34 |
| 2004/0154011 A1 * | 8/2004 | Wang et al. .................... | 717/158 |
| 2007/0022412 A1 | 1/2007 | Tirumalai et al. | |

(Continued)

OTHER PUBLICATIONS

Chaudhry, Shailender, et al., "Simultaneous Speculative Threading: A Novel Pipeline Architecture Implemented in Sun's ROCK Processor," Jun. 20-24, 2009, Sun Microsystems, Austin, TX, 12 pages.

(Continued)

*Primary Examiner* — William B Partridge
*Assistant Examiner* — Keith Nielsen
(74) *Attorney, Agent, or Firm* — Meyertons, Hood, Kivlin, Kowert & Goetzel, P.C.

(57) ABSTRACT

Techniques are disclosed relating to reducing the latency of restarting a pipeline in a processor that implements scouting. In one embodiment, the processor may reduce pipeline restart latency using two instruction fetch units that are configured to fetch and re-fetch instructions in parallel with one another. In some embodiments, the processor may reduce pipeline restart latency by initiating re-fetching instructions in response to determining that a commit operation is to be attempted with respect to one or more deferred instructions. In other embodiments, the processor may reduce pipeline restart latency by initiating re-fetching instructions in response to receiving an indication that a request for a set of data has been received by a cache, where the indication is sent by the cache before determining whether the data is present in the cache or not.

21 Claims, 12 Drawing Sheets

(56) References Cited

U.S. PATENT DOCUMENTS

| | | | |
|---|---|---|---|
| 2008/0005534 A1* | 1/2008 | Jourdan et al. | 712/206 |
| 2008/0016325 A1* | 1/2008 | Laudon et al. | 712/217 |
| 2008/0162818 A1* | 7/2008 | Okawa et al. | 711/122 |
| 2008/0209177 A1* | 8/2008 | Frommer et al. | 712/214 |
| 2009/0063899 A1* | 3/2009 | Jordan et al. | 714/17 |
| 2009/0172361 A1* | 7/2009 | Holloway et al. | 712/220 |

OTHER PUBLICATIONS

Tremblay, Marc and Chaudhry, Shailender, "A Third-Generation 65nm 16-Core 32-Thread Plus 32-Scout-Thread CMT SPARC® Processor," 2008, IEEE International Solid-State Circuits Conference, Sun Microsystems, Santa Clara, CA, 2 pages.

\* cited by examiner

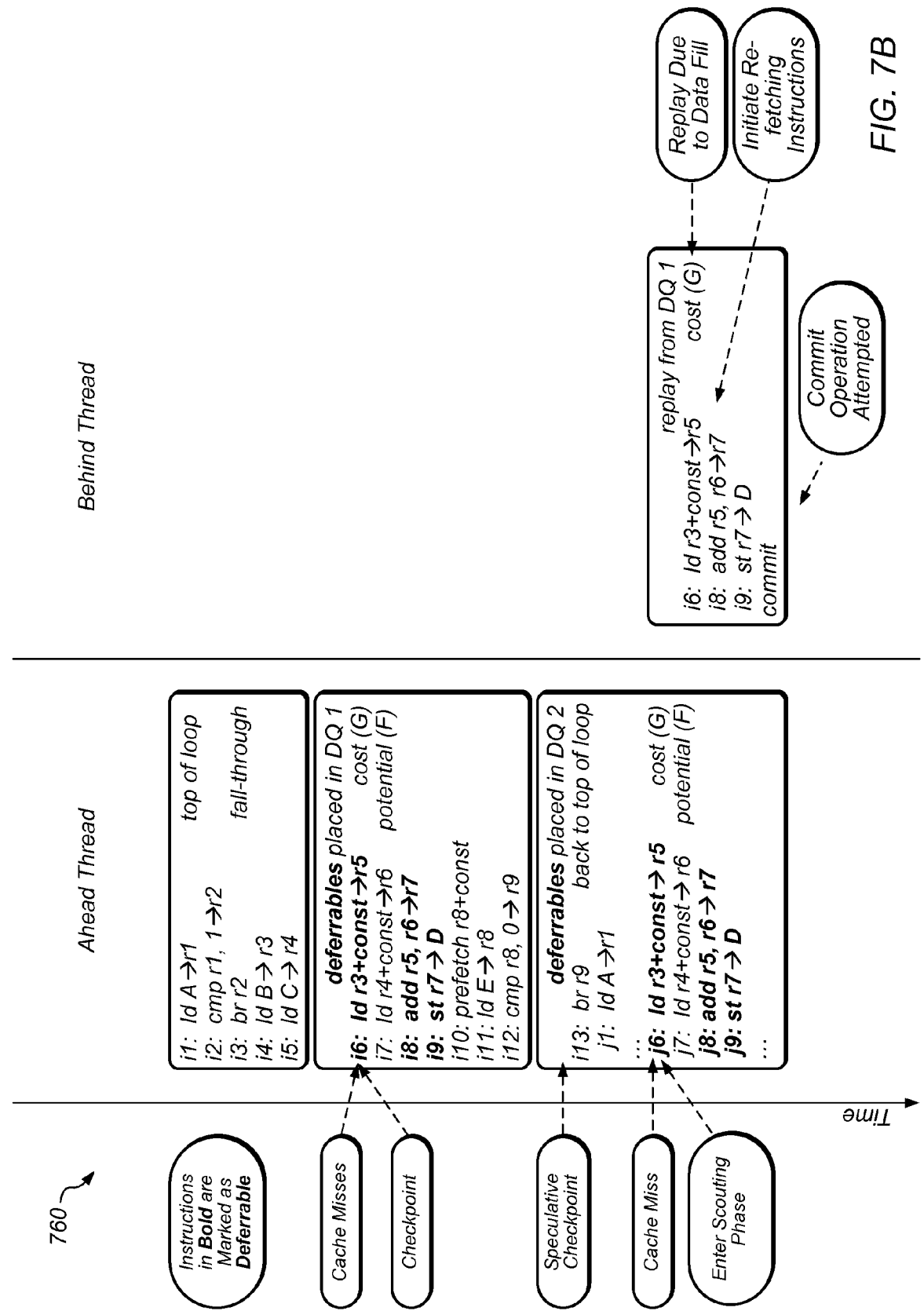

US 9,086,889 B2

REDUCING PIPELINE RESTART PENALTY

BACKGROUND

1. Technical Field

This disclosure relates to computer processors, and more specifically to reducing a restart latency in a processor.

2. Description of the Related Art

In executing a computer program, program order is generally followed in order to ensure correct results. Thus, when a first instruction is followed by a second instruction that depends on the first instruction's result, the execution of the second instruction is not completed until the first instruction's result becomes available. Sometimes a result will be available almost immediately. Other times, a result may take hundreds of processor cycles to become available—for example, in the case of a memory load that misses a data cache (e.g., an L1 cache) and must retrieve the desired data from elsewhere in the memory hierarchy (e.g., an L2 cache, main memory, etc.). One option in response to a lengthy delay in obtaining results (e.g., a memory cache miss) is to stall. Other options may include executing instructions speculatively or performing "scouting."

To perform scouting, a processor executes one or more scouting threads to prefetch data for a main thread. The scouting threads may differ from the main thread in that the scouting threads may include only the instructions that are relevant for calculating memory addresses and issuing cache requests. Results of these scouting threads are not committed, however. When a scouting thread is executed, the scouting thread may not stall upon encountering a cache miss but rather may continue to execute as though the cache miss did not occur. By doing so, the scouting thread causes multiple cache requests to be issued and serviced in parallel, instead of sending requests and servicing them sequentially. The cost of servicing multiple cache requests can thus be amortized.

SUMMARY

Techniques and structures are disclosed herein that allow a processor that implements scouting to reduce the latency of restarting a pipeline. In one embodiment, a processor is disclosed that includes a first instruction fetch unit configured to initiate re-fetching one or more instructions of a thread in response to receiving an indication that the thread has begun executing in a scouting phase. The first instruction fetch unit is configured to initiate the re-fetching of the one or more instructions of the thread prior to the thread ending the scouting phase. In one embodiment, the first instruction fetch unit is configured to alternate between fetching instructions of the thread that are to be executed in the scouting phase and the re-fetching of the one or more instructions of the thread that are to be executed after the thread ends the scouting phase. In one embodiment, the processor includes a second instruction fetch unit configured to operate in parallel with the first instruction unit and to fetch instructions of the thread that are to be executed during the scouting phase.

In another embodiment, a processor is disclosed that includes a first instruction fetch unit configured to fetch instructions for execution and a control unit. The processor is configured to execute instructions for an ahead thread and a behind thread. The processor is configured to initiate executing the ahead thread in a scouting phase. The control unit is configured to receive an indication that a commit operation is to be attempted with respect to one or more deferred instructions of the behind thread. The control unit is further configured to initiate, prior to the commit operation being attempted, fetching one or more instructions of the ahead thread that were previously fetched while the processor was executing the ahead thread in the scouting phase.

In still another embodiment, a processor is disclosed that includes a first instruction fetch unit and a memory interface unit. The processor is configured to execute a thread in a scouting phase in response to an instruction in the thread causing a miss in a first cache for a set of data. The memory interface unit is configured to send, in response to the miss in the first cache, a request for the set of data to a second cache. The first instruction fetch unit is configured to initiate re-fetching the instruction in response to receiving an indication that the request has been received by the second cache, where the instruction fetch unit is configured to begin the re-fetching prior to the second cache completing the request.

BRIEF DESCRIPTION OF THE DRAWINGS

FIG. 7B is an example of reducing pipeline clear latency by re-fetching instructions in response to determining that a commit operation is to be attempted with respect to one or more deferred instructions.

DETAILED DESCRIPTION

Figure 1:
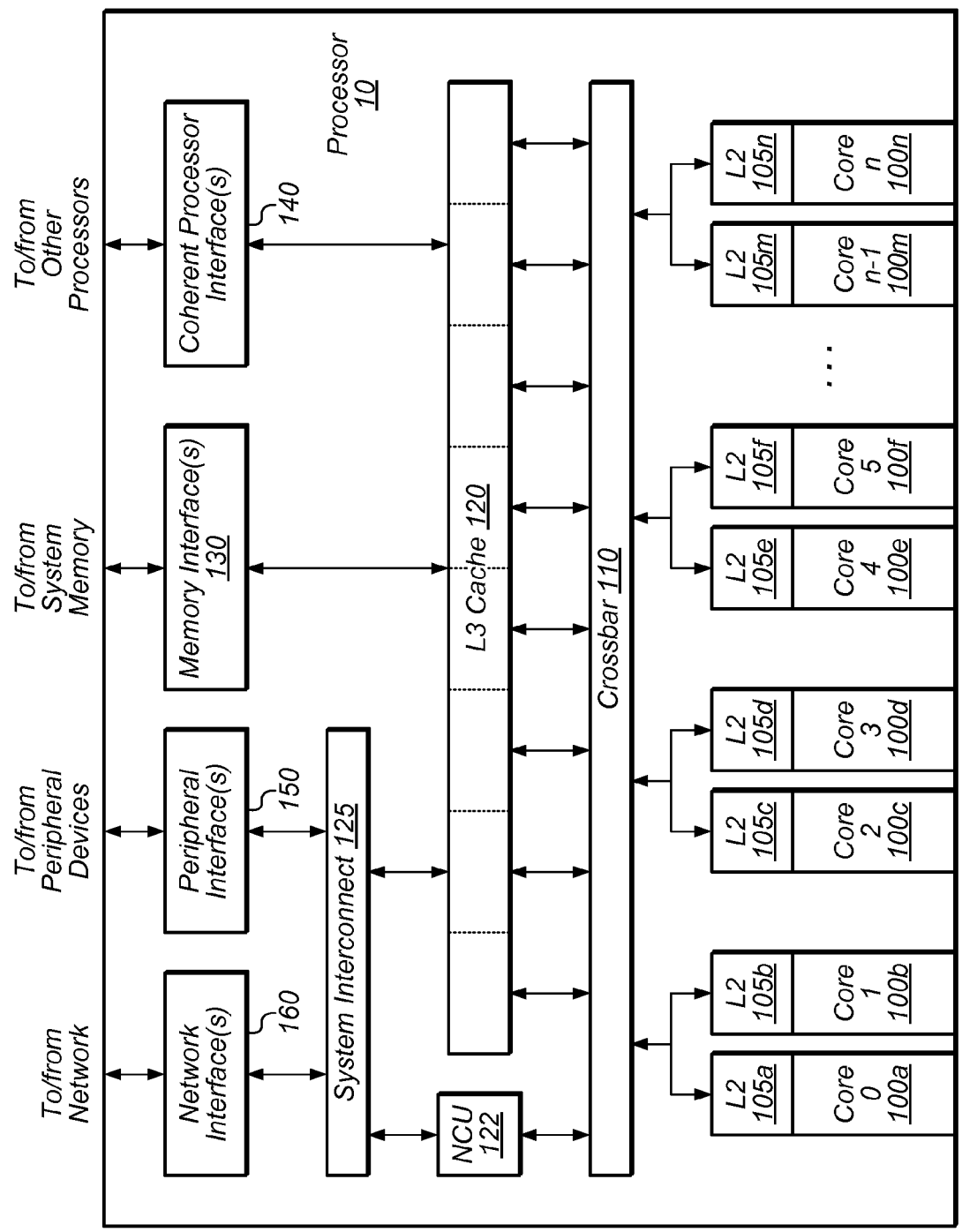
FIG. 1 is a block diagram illustrating one embodiment of a processor.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"Thread." As used herein, this term refers broadly to a set of instructions within a program that is executable by a processor. The term "thread" is thus used herein to indicate a group of instructions generally (e.g., a sequence of instructions), and is not limited for example, to a group of instructions executing on a processor as a result of a "fork" or other similar operation.

"Scouting." This term has its ordinary and accepted meaning in the art, and includes executing instructions without committing their results in order to cause the prefetching of data for instructions that would otherwise result in a cache miss.

"Scouting Phase." This term refers to a time period in which a processor (or cores within the processor) performs scouting. Alternatively, "non-scouting phase" refers to a time period in which a processor is not performing scouting and is thus committing results of executed instructions. The phrase "instructions executed in a scouting phase" refers to instructions that are executed in order to perform scouting, but the results of those executed instructions are not committed. Different instances of executing in scouting may be referred to as different instances of scouting phases—e.g., a first scouting phase, a second scouting phase, etc. During a given scouting phase, the processor can be said to be executing in a "scouting mode."

"Scouting Thread." This term is has its ordinary and accepted meaning in the art, and includes a thread that includes instructions that are executed in a scouting phase. Alternatively, a "non-scouting thread" refers to a thread that is not executing in scouting phase.

"Speculative Execution." This term refers to executing instructions out of order, where the results of each executed instruction are committed speculatively until the results of instructions on which that instruction depends are committed. Accordingly, the results of a particular instruction may not be committed if the results of another instruction on which that particular instruction depends are not committed. Note that "speculative execution" differs from "scouting" in that results of instructions executed in a scouting phase are not committable.

"Speculative Phase." This phrase refers to a time period in which a processor (or cores within the processor) performs speculative execution, where results of executed instructions are committable.

"Deferred instruction"; "Non-deferred instruction." As used herein, a "deferred" instruction is an instruction that cannot yet be executed because it is waiting for data that is not yet available. As one example, an instruction that causes a cache miss may be a deferred instruction. A deferred instruction can also be an instruction that is dependent on an instruction that is (or was) waiting for data. Continuing with the above example, an instruction that is dependent on the instruction that causes a cache miss is also a deferred instruction (this instruction may continue to be referred to as a deferred instruction even after the cache miss instruction is executed, in order to differentiate the dependent instructions from one or more instructions that were not dependent on the cache miss instruction). In contrast, a "non-deferred" instruction is an instruction that is not waiting for data in order to be executed.

"Checkpoint." This term refers to a point in time at which a condition occurs that causes a processor (or cores within a processor) to save information that preserves an architectural state of the processor (and may include values for all architected registers specified by an instruction set). The phrase "taking a checkpoint" refers to saving at least a portion of an architectural state of the processor so that execution can later be resumed by using these saved values.

"Behind thread"; "Ahead thread." As used herein, these terms refer to two different threads being executed by a processor. At a given point in time, the "behind" thread is the one of the two different threads that includes the earliest (in program order) uncompleted instruction; the other thread at the given point in time is thus the "ahead" thread. Consider an example in which a checkpoint is taken due to an instruction that causes a cache miss. After the checkpoint is taken, the "ahead" thread includes instructions that are later in program order relative to the instruction that caused the cache miss. Conversely, at the time the checkpoint is taken, the "behind" thread includes at least one instruction that is earlier in program order than all of the instructions in the ahead thread. Thus, the behind thread may include the instruction that caused the cache miss. The behind thread may also include instructions that depend on the instruction that caused the cache miss. Stated another way, at the time a checkpoint is taken, the thread that includes the non-deferred instructions is the ahead thread, and the thread that includes the deferred instructions is the behind thread. Note that as instructions in what are initially termed the "ahead" and "behind" threads are executed, the notion of which instructions are in the "ahead" and "behind" threads may change.

"Commit operation." This term refers to the process of committing the results of all instructions stored in a given deferred queue. Consider the situation in which a processor is executing a behind thread and an ahead thread that writes the results of its retirable instructions to a current speculative register file i and places its deferrable instructions in the corresponding deferred queue i (DQi). At any given time, the behind thread may attempt to execute instructions from the oldest DQ. In particular, assuming that the oldest DQ is DQi, in one embodiment, the behind thread waits until at least one of the instructions in DQi can be retired, at which point the behind thread executes all of the instructions from DQi, redeferring them as necessary. Once all of the instructions in DQi have been speculatively retired, in one embodiment, the committed checkpoint is discarded, speculative register file i becomes the new committed checkpoint (as used herein, the committed checkpoint is the last point in time at which architectural state is updated), and speculative register file i is freed (and can thus be used by the ahead thread when needed). This operation may be referred to herein as a "commit operation."

Introduction

As noted above, executing instructions speculatively is one alternative to stalling for a result to become available. In speculative execution, instructions may be executed in a different order than defined by the program (i.e., executed out of order), where the results of some executed instructions may not be used. For example, a processor may begin fetching and executing instructions that are dependent upon a branch instruction based on a predicted outcome of that instruction. If, upon execution of that branch instruction, the processor determines that it mispredicted the outcome, the processor will not use the results of those dependent instructions. As another example, if a thread includes a load instruction that has caused a cache miss (i.e., the load instruction is a deferred instruction), the processor may execute instructions that come after the load instruction in program order if those instructions are not dependent on the load instruction. The processor may then execute the load instruction once the needed data has been retrieved from memory (i.e., the cache request has been serviced).

In some instances, a processor may execute deferred instructions and non-deferred instructions within separate threads referred to herein respectively as an "ahead thread" and a "behind thread." By dividing instructions into separate threads, instructions in the ahead thread can be executed while the instructions in the behind thread wait for data. When the data becomes available, the instructions in the behind thread can begin execution while the ahead thread continues to execute in parallel. Once the instructions in the behind thread have been executed and committed, the ahead thread and behind thread may then be joined back into a single thread, including the results of both executed threads.

To support speculative execution of instructions, a processor may support periodically saving an architectural state of the processor with respect to the executing program (or program thread). As noted above, the process of saving this state may be referred to as taking a checkpoint. As but one example, a checkpoint might be taken by a processor that predicts an instruction stream to take one instruction path upon encountering a branch instruction (i.e., as opposed to taking another instruction path). Upon determining that the branch has been mispredicted, execution could be rolled back to the checkpoint by restoring the saved architectural state associated with the checkpoint.

A processor may not be able to perform speculative execution in all instances. In one instance, a processor may be configured to support only N checkpoints. If the processor has taken N checkpoints and an executing thread includes an instruction would cause an additional checkpoint to be taken, the processor may not be able to continue executing in a speculative phase. As one example, a processor may include a store buffer that is configured to buffer data of store instructions until they can be committed. If that store buffer is full and the processor executes an additional store instruction, a processor may not be able to continue executing in the speculative phase. As yet another example, a processor may include one or more deferred queues configured to store deferred instructions. If the processor is unable to store additional deferred instructions because a deferred queue is full, a processor may not be able to continue executing in the speculative phase.

When speculative execution cannot be performed or is not supported, scouting is another alternative. As noted above, a processor may implement scouting in order to minimize the penalty incurred by multiple cache misses. Consider a situation in which a first memory load instruction of a thread misses in the cache. The data for the miss comes back after a relatively long delay. Upon resuming execution, a second instruction also causes a cache miss. By scouting, the processor can execute a scouting thread that causes the servicing of the cache miss of the second instruction to have already occurred at the time the cache miss of the first instruction is being serviced, allowing the processor to service multiple cache misses with a shorter delay than servicing each miss in sequence (i.e., taking the full cache miss penalty for each miss). Execution in a scouting phase thus involves the processor attempting to circumvent or reduce future stalls (e.g., those caused by future memory load instructions).

As an example, consider the following instruction sequence:

I201 LOAD [Address1], Reg1
I202 ADD Reg1, Reg2, Reg3
I203 LOAD [Address2], Reg2
I204 ADD Reg5, Reg6, Reg7

The first instruction (I201) is an instruction to load a value from memory into a register Reg1. The next instruction in program order, I202, uses Reg1 as an operand and cannot be properly completed until a value for Reg1 becomes available. If I201 misses the cache, a delay might ensue while data is accessed. After this delay, and when Reg1 becomes available, I202 can be executed. But the next instruction I203 may also miss the cache, immediately causing another lengthy stall.

In a processor supporting a scouting phase, upon the processor detecting that I201 has caused a cache miss, the execution of I203 (and other subsequent instructions) may be performed to cause data to be prefetched from memory into the cache. Accordingly, instead of simply stalling until I201's results are available, the processor can proceed to determine if the memory value for Address2 (used by I203) is present in the cache. If the value is not present, the processor can cause the memory subsystem to begin fetching the Address2 value from memory at the same time that Address1 value is also being fetched. The delays caused by I201 and I203 will thus overlap instead of being sequential, which can lower the overall total delay experienced during program execution.

As noted above, instructions executed in a scouting phase are not committed, and thus do not update architectural state. As a result, those instructions must be re-fetched and re-executed. The process of re-fetching and re-executing instructions, however, can take a significant amount of time given that pipelines in modern processors have grown significantly to support higher operating frequencies. As used herein, the term "execution pipeline" refers broadly to circuitry within a processor that is configured to perform the execution of instructions, including fetching, decoding, issuing, etc., in addition to circuitry that actually calculates an instruction result (e.g., an execution unit). Accordingly, restarting an "execution pipeline" refers to the process flushing previous contents from the pipeline, fetching new instructions for execution, and initiating execution of those instructions.

Figure 2:
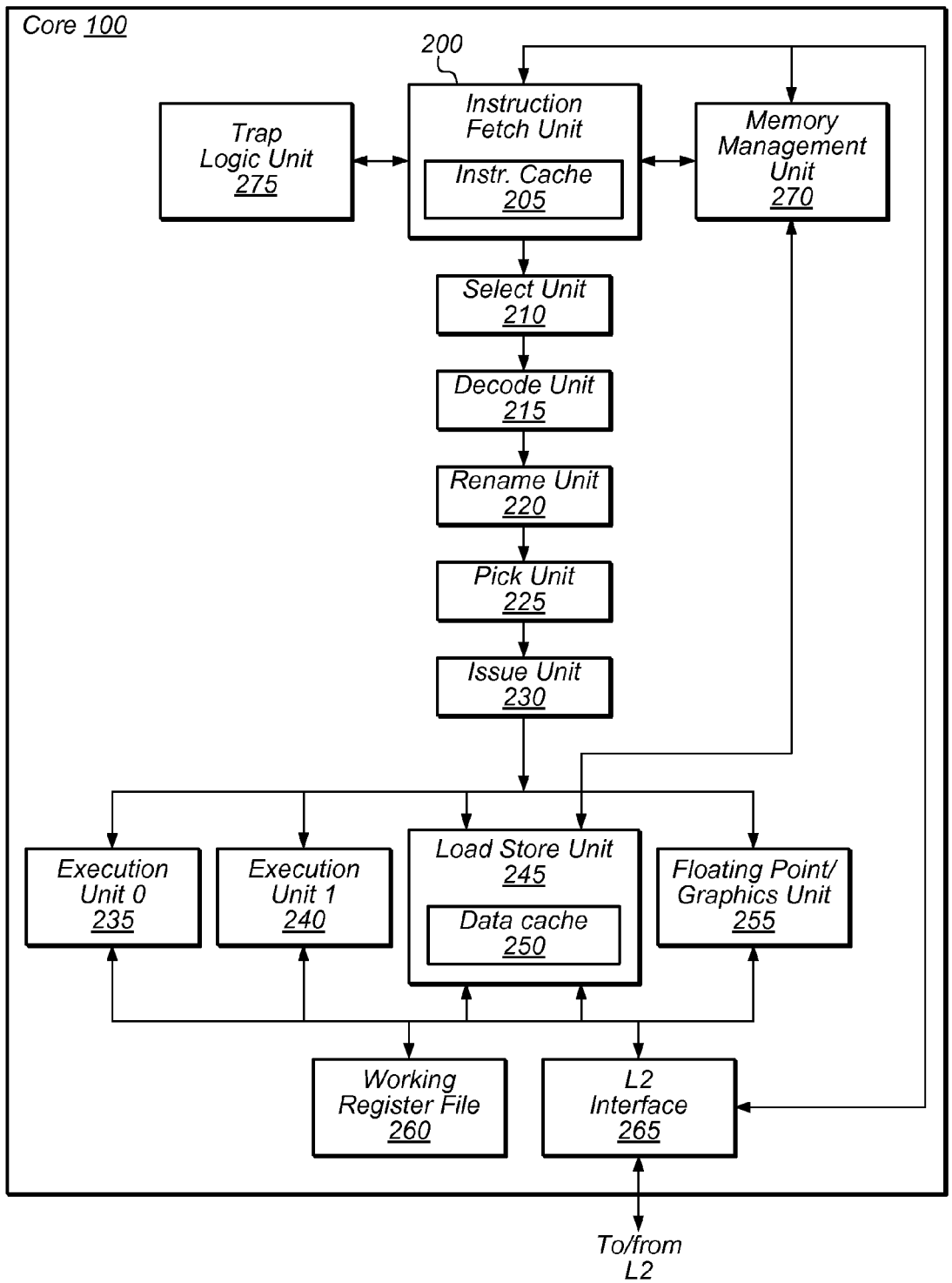
FIG. 2 is a block diagram illustrating one embodiment of a processor core.
Figure 3:
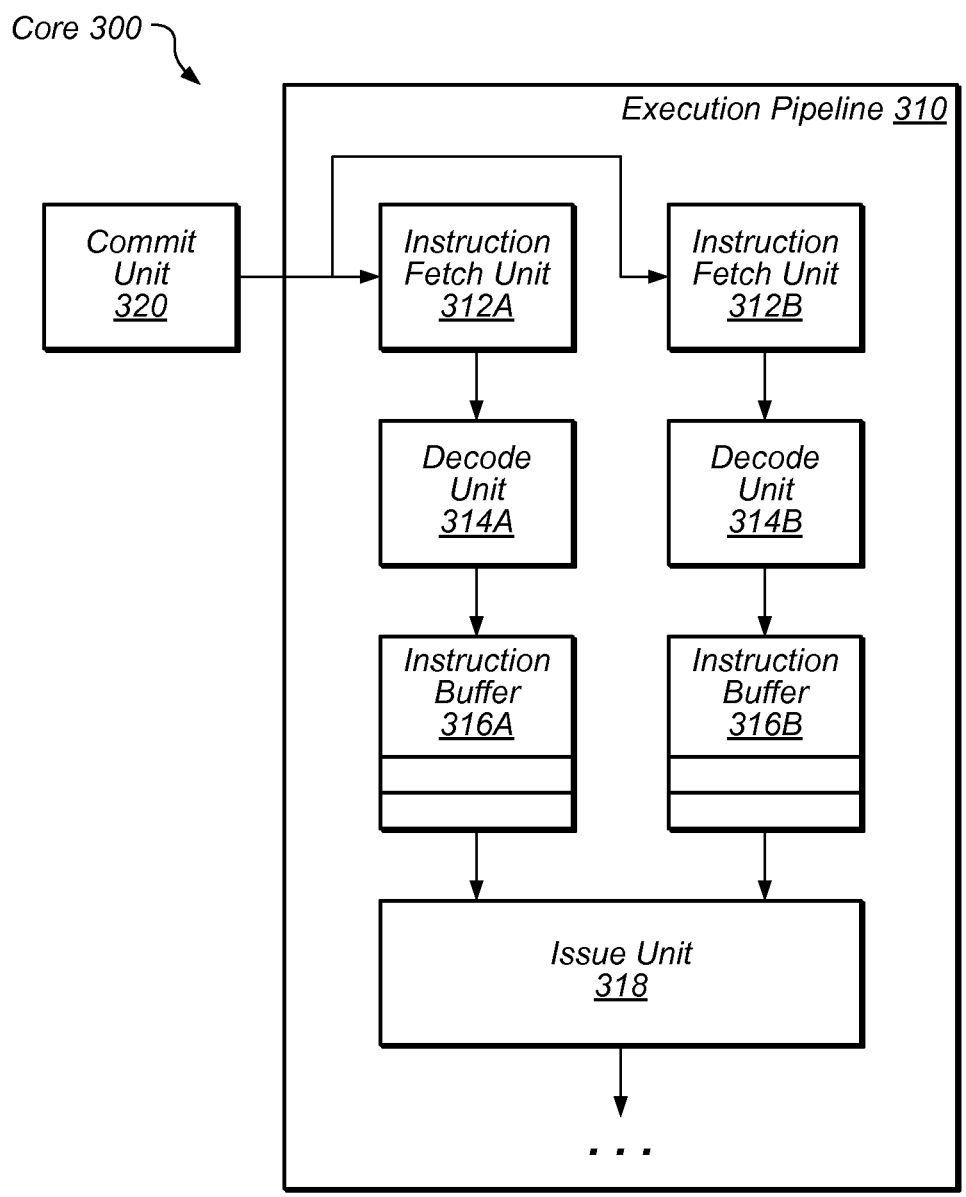
FIG. 3 is a block diagram illustrating one embodiment of a processor core configured to reduce pipeline restart latency by initiating re-fetching instructions in response to determining to execute a thread in a scouting phase.
Figure 4:
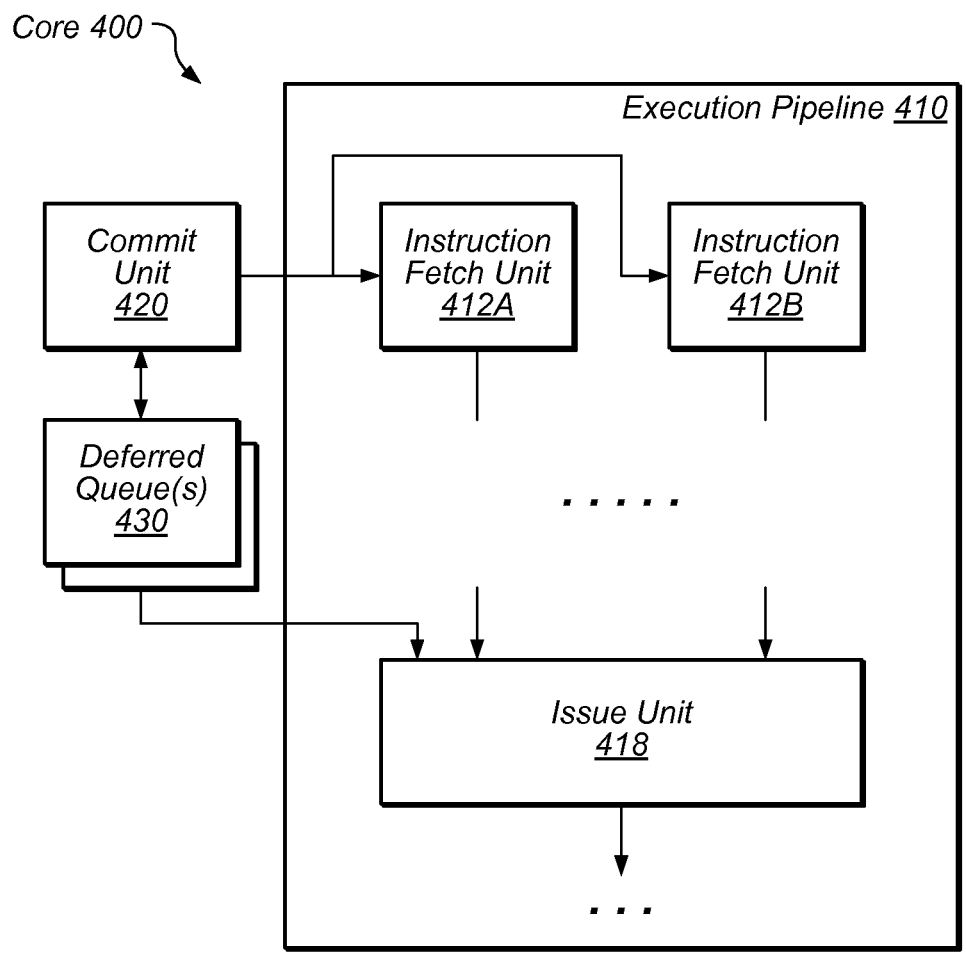
FIG. 4 is a block diagram illustrating one embodiment of a processor core configured to reduce pipeline restart latency by initiating re-fetching instructions in response to determining that a commit operation is to be attempted with respect to one or more deferred instructions.
Figure 5:
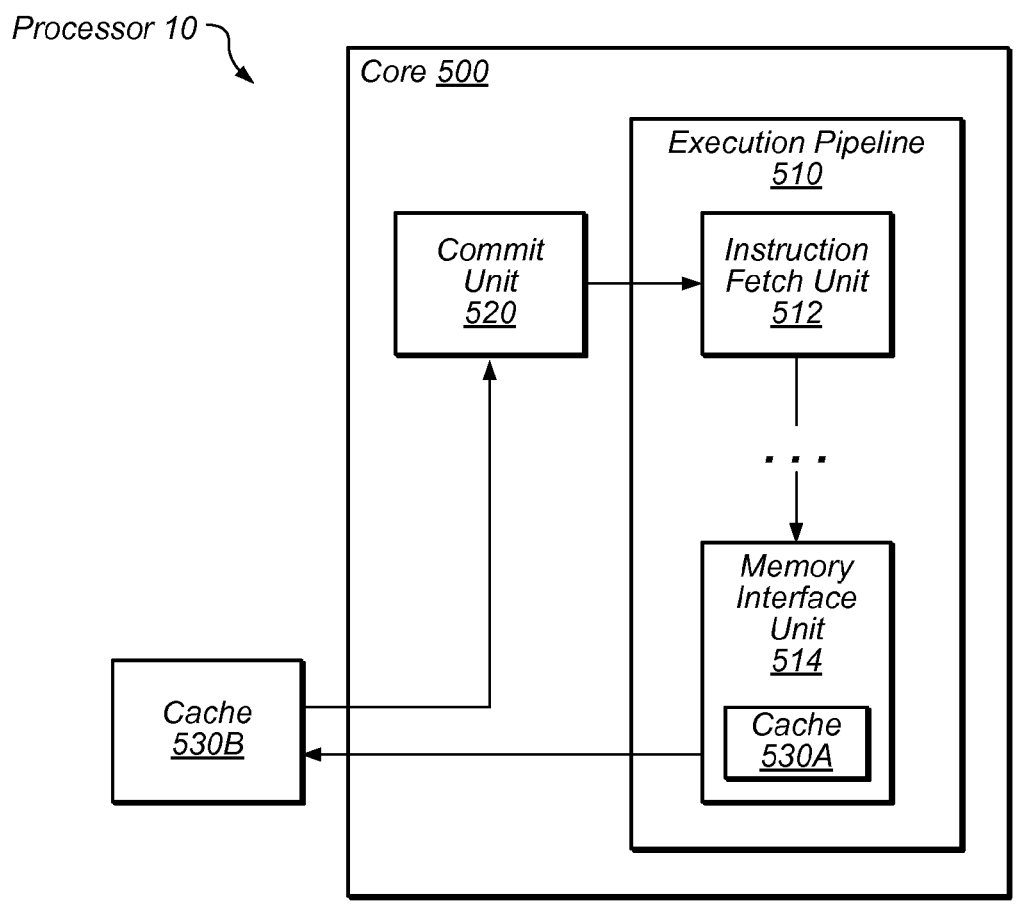
FIG. 5 is a block diagram illustrating one embodiment of a processor core configured to reduce pipeline restart latency by initiating re-fetching instructions in response to receiving an indication that a request for a set of data has been received by a cache.

The present disclosure describes various embodiments of a processor that implements various techniques to reduce the latency of restarting an execution pipeline. In some embodiments, the processor may support speculative execution and/ or scouting. FIGS. 1 and 2 present an overview of an exemplary multithreaded processor. FIGS. 3-5 present embodiments of a processor core that includes structures configured reduce the latency of performing an execution pipeline restart. FIGS. 6-8 present embodiments of methods that may be performed by such a processor. FIG. 9 presents an overview of a computer system in which such a processor may be used.

General Overview of a Multithreaded Processor

Turning now to FIG. 1, a block diagram illustrating one embodiment of a processor 10 is shown. In certain embodiments, processor 10 may be multithreaded. In the illustrated embodiment, processor 10 includes a number of processor cores 100*a-n*, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100*a-n* and L2 caches 105*a-n* may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel (i.e., concurrently). Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VISTM) architecture, such as VISTM 2.0 or VISTM 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Reducing Pipeline Restart Penalty in a Processor

As noted above, instructions previously executed in a scouting phase are re-fetched and re-executed in order to update architectural state because those instructions were not committed when first executed. To reduce the latency of restarting the pipeline including re-fetching and initiating execution of those instructions, processor 10 may implement various techniques described below.

Turning now to FIG. 3, one embodiment of a processor core 300 (which may be included within processor 10 in some embodiments) configured to reduce pipeline restart latency by initiating re-fetching instructions in response to determining to execute a thread in a scouting phase is shown. As will be described below, core 300, in one embodiment, may fetch instructions using a first instruction fetch unit (IFU) while simultaneously re-fetching instructions using a second IFU. In another embodiment, core 300 may use the same instruction fetch unit for fetching and re-fetching instructions in parallel. By initiating re-fetching instructions in response to determining to execute a thread in a scouting phase, core 300 may have a smaller restart latency than if it began re-fetch instructions after ending the scouting phase.

In the illustrated embodiment, core 300 includes an execution pipeline 310 and a commit unit 320. In various embodiments, execution pipeline 310 is representative of circuitry that is configured to execute instructions (as noted above, the term "execute" here is used broadly to refer to performing various stages needed to initiate, perform, and commit an instruction). In the illustrated embodiment, execution pipeline 310 includes instruction fetch units (IFUs) 312A and 312B that are coupled to respective decode units 314A and 314B that are, in turn, coupled to respective instruction buffers 316A and 316B. The instructions buffers 316 are coupled to issue unit 318. In some embodiments, execution pipeline 310 may include additional or less IFUs 312. In various embodiments, issue unit 318 may be coupled to one or more additional structures including execution units 235 and 240, load store unit 245, FPG 255, or other structures such as those shown within core 100 in FIG. 2. (In some embodiments, commit unit 320 may also be considered as being part of execution pipeline 310). In various embodiments, units 312-320 may operate in a similar manner as units 200-275 described in FIG. 2. In some embodiments, core 300 may include additional structures to support speculative execution, such as deferred queues, speculative register files, etc.

In one embodiment, IFUs 312A and 312B are configured to fetch instructions that are to be executed in pipeline 310. In some embodiments, core 300 may execute these instructions in a "normal phase", a speculative phase, or a scouting phase. As noted above, instructions executed in scouting phase are re-executed if they are to be committed. As will be described below, in some embodiments, one of IFUs 312 may be selected to re-fetch instructions when core 300 is executing instructions in a scouting phase.

In one embodiment, decode units 314A and 314B are configured to decode instructions fetched by IFUs 312A and 312B, respectively. In various embodiments, decode units 314 are configured to operate in parallel with one another. That is, decode unit 314A is configured to decode instructions while decode unit 314B is also decoding instructions. In one embodiment, decode unit 314A and 314B are configured to store the decoded instructions in respective instruction buffers 316A and 316B. In some embodiments, IFUs 312 may share a decode unit 314 and/or instruction buffer 316.

In one embodiment, instruction buffers 316A and 316B are configured to store instructions that have been fetched and decoded. As will be described below, in some embodiments, when core 300 is executing instructions in a scouting phase, one of the buffers 316 is configured to store instructions that are to be executed in the scouting phase and not committed. The other buffer 316 is configured to store instructions that are to be executed and committed once core 300 ends the scouting phase.

In one embodiment, issue unit 318 is configured to issue instructions for execution in pipeline 310. As will be described below, in one embodiment, when core 300 is executing instructions in a scouting phase, issue unit 318 is configured to issue instructions of a thread that are to be executed in the scouting phase and to not issue re-fetched instructions of the thread until those instructions can be executed in a non-scouting phase. Once core 300 ends the scouting phase, issue unit 318, in one embodiment, is configured to issue re-fetched instructions of the thread.

In one embodiment, commit unit 320 is configured to cause results of instructions executed in pipeline 310 to be committed to an architectural state of the processor (i.e., retired). In various embodiments, commit unit 320 may communicate with various units in pipeline 310, such as, IFUs 312, issue unit 318, etc. In one embodiment, commit unit 320 is configured to send a pipeline clear signal to units within pipeline 310, where the pipeline clear signal specifies that the results of in-flight instructions (i.e., those instructions being executed within pipeline 310) are to be discarded (i.e., flushed). In one embodiment, commit unit 320 may send a pipeline clear signal to units within pipeline 310 upon determining that a path of a branch has been mispredicted and that instructions of the alternate path need to be executed. In some embodiments, commit unit 320 may send a pipeline clear signal when core 300 transitions from a scouting phase to a non-scouting phase. In various embodiments, commit unit 320 may include trap-handling logic configured to implement various functionality of TLU 275 described above.

In one embodiment, commit unit 320 is configured to determine whether a thread is to be executed in a "normal" phase, a speculative phase, or a scouting phase and to cause core 300 to execute the thread in that phase. For example, in one embodiment, commit unit 320 is configured to cause a thread to execute in a speculative phase in response to determining that a checkpoint should be taken in that executing thread. Alternatively, in one embodiment, commit unit 320 is configured to cause a thread to execute in a scouting phase if that the thread cannot be executed in a speculative phase. As note above, there are several reasons why a thread might not be able to be executed speculatively. For example, in some embodiments, core 300 may support taking up to N checkpoints. In one embodiment, if N checkpoints have already been taken, commit unit 320 is configured to cause a thread to be executed in a scouting phase in response to determining that core 300 is attempting to execute an instruction that would cause an additional checkpoint to be taken—thus, core 300 would exceed the maximum number of supported checkpoints. Commit unit 320 may also cause a thread to execute in a scouting phase based on other conditions. In one embodiment, commit unit 320 is configured to cause a thread to execute in a scouting phase if core 300 does not have sufficient space to store deferrable instructions of that thread. For example, in some embodiments, core 300 may include a deferred queue (e.g., deferred queue 430 described below)

configured to store N instructions. If an executing thread includes a deferrable instruction and the deferred queue is already storing N instructions (i.e., it is full), commit unit 320, in some embodiments, may determine to execute that thread in a scouting phase. As another example, in one embodiment, commit unit 320 may be configured to cause a thread to execute in a scouting phase if that thread includes a store instruction that needs space in a store queue (e.g., within LSU 245) and the store queue is currently full. In various embodiments, commit unit 320 is configured to end the scouting phase once the condition that caused core 300 to enter the scouting phase has been resolved. For example, in one embodiment, if core 300 enters a scouting phase in response to a load instruction causing a cache miss, commit unit 320, in one embodiment, is configured to cause core 300 to end the scouting phase upon determining that the requested data for that instruction has returned.

As noted above, instructions executed in a scouting phase are re-fetched and re-executed if they are to be committed. In one embodiment, when core 300 is executing a thread in a scouting phase, commit unit 320 is configured to instruct the IFUs 312 to initiate re-fetching one or more instructions before core 300 ends the scouting phase. In some embodiments, commit unit 320 is configured to instruct the IFUs 312 to initiate re-fetching instructions upon determining a thread is to be executed in a scouting phase—e.g., commit unit 320 may have detected that one of the conditions described above has occurred. In some embodiments, commit unit 320 may provide information to IFUs 312 that is usable to determine the instructions that need to be re-fetched. For example, in one embodiment, commit unit 320 is configured to specify the instructions to be re-fetched by specifying the thread that is to be executed in a scouting phase. In other embodiments, commit unit 320 may specify the instructions to be re-fetched by identifying the memory address (e.g., the program counter) of the first instruction to be re-fetched. In one embodiment, this memory address may be stored when a checkpoint was taken.

As noted above, in one embodiment, IFUs 312 are configured to fetch instructions that are to be executed in pipeline 310. In some embodiments, IFUs 312 are configured to perform differently depending on whether core 300 is operating in a scouting phase or not. When core 300 is operating in a non-scouting phase, one or both IFUs 312 may fetch instructions for one or more threads. For example, in one embodiment, IFU 312A is configured to fetch instructions for one thread while IFU 312B is configured to fetch instructions for another thread. Alternatively, in other embodiments, a single one of the IFUs 312 (e.g., IFU 312A) is selected to fetch instructions, while the non-selected IFU 312 (e.g., IFU 312B) is placed in a standby mode (i.e., it is not used).

In one embodiment, once core 300 begins executing a thread in a scouting phase, the IFU 312 that is already fetching instructions for that thread becomes a primary IFU while the other IFU 312 is selected to function as secondary IFU. In one embodiment, the IFU 312 selected as the primary IFU is configured to continue fetching instructions for that thread, where those instructions are to be executed in the scouting phase. In one embodiment, the IFU 312 selected as the secondary IFU is configured to re-fetch one or more instructions in parallel with the primary IFU, where the re-fetched instructions are to be subsequently executed in a non-scouting phase. In various embodiments, each IFU 312 is configured to operate as primary IFU or a secondary IFU and may periodically alternate between roles. For example, IFU 312A may operate as primary IFU and then subsequently operate as a secondary IFU.

In one embodiment, the secondary IFU may re-fetch instructions that were executed in the scouting phase—i.e., the instructions that were previously fetched and executed but not committed. In some embodiments in which core 300 supports speculative execution, the secondary IFU is configured to re-fetch instructions executed since the last checkpoint that was taken. For example, if an executing thread caused a first checkpoint to be taken followed by a second subsequent checkpoint and then that thread began executing in a scouting phase, the second IFU would re-fetch the instructions executed after taking the second checkpoint—i.e., the youngest checkpoint of the two checkpoints. (This scenario is described in more detail below in conjunction with FIG. 6B.) As noted above, in some embodiments, commit unit 320 may specify the instructions to be re-fetched.

As noted above, when core 300 is executing instructions in a scouting phase, issue unit 318, in one embodiment, is configured to issue instructions from the instruction buffer 316 that were fetched by the primary IFU 312 without issuing any instructions re-fetched by the secondary IFU 312. For example, in one embodiment, if buffer 316A is storing instructions fetched by IFU 312A and IFU 312A is the primary IFU, issue unit 318 is configured to issue instructions from buffer 316A without issuing instructions from buffer 316B. In one embodiment, issue unit 318 is configured to initiate issuing re-fetched instructions in response to receiving an instruction from commit unit 320. For example, in one embodiment, if issue unit 318 receives an indication from commit unit 320 that core 300 is ending a scouting phase, issue unit 318 may begin issuing re-fetched instructions from buffer 316B. In some embodiments, the received indication sent by commit unit 320 is referred to as a pipeline clear signal.

Although embodiments of core 300 may use separate IFUs 312 to fetch and re-fetch instructions, in other embodiments, core 300 may implement the same mechanism by allocating fetch bandwidth in a shared fetch unit 312. For example, the shared fetch unit 312 may initially be fetching instructions of a thread that are being executed in a speculative phase. Once the shared fetch unit 312 receives an indication to re-fetch instructions, the shared fetch unit 312, in one embodiment, is configured to redirect fetch bandwidth from fetching instructions that are to be executed in the scouting phase to re-fetching instructions that are to be executed after ending the scouting phase. For example, in some embodiment, the shared fetch unit 312 may be configured to time slice fetching such that it alternates between fetching instructions on odd clock cycles and re-fetching instructions on even clock cycles. In various embodiments, the shared fetch unit 312 may employ similar techniques such as those employed by IFU 312A and IFU 312B.

By fetching instructions while simultaneously re-fetching instructions, processor 10, in some embodiments, can begin issuing those instructions upon ending a scouting phase without having to re-fetch and decode those instructions. Thus, in some instances, processor 10 may have a lesser restart latency than other processors that fetch instructions during a scouting phase and then initiate re-fetching those instructions after ending the scouting phase.

A block diagram illustrating one embodiment of a method for reducing pipeline restart latency by initiating re-fetching instructions in response to determining to execute a thread in a scouting phase is described below in conjunction with FIG. 6A.

Turning now to FIG. 4, one embodiment of a processor core 400 (which may be included within processor 10 in some embodiments) configured to reduce pipeline restart latency by initiating re-fetching instructions in response to determining that a commit operation is to be attempted with respect to one or more deferred instructions is shown. As will be described below, in some embodiments, core 400 is configured to end a scouting phase after performing the commit operation. By initiating re-fetching of instructions upon determining that a commit operation is to be attempted, core 400 can begin fetching instructions before ending a scouting phase. As a result, core 400 can initiate executing re-fetched instructions as soon as it ends a scouting phase—thus, reducing core 400's restart latency.

In the illustrated embodiment, core 400 includes an execution pipeline 410, commit unit 420, and one or more deferred queues 430. As noted above, execution pipeline 410 is representative of circuitry that is configured to execute instructions. In the illustrated embodiment, execution pipeline 410 includes instruction fetch units (IFUs) 412A and 412B and issue unit 418. In other embodiments, execution pipeline 410 may include a single IFU 412 (as opposed to multiple ones). In various embodiments, execution pipeline 410 includes one or more additional structures including execution units 235 and 240, load store unit 245, FPG 255, or other structures such as those shown within core 100 in FIG. 2. (In some embodiments, commit unit 420 and/or deferred queue 430 may also be considered as being part of execution pipeline 410). In various embodiments, elements 412-430 may operate in a similar manner as elements 200-275 described in FIG. 2.

In one embodiment, IFUs 412 are configured to fetch instructions for execution in pipeline 410. In some embodiments, IFUs 412 are configured to operate as primary and secondary IFUs when core 400 is executing instructions in a scouting phase (such as described above in conjunction with FIG. 3). For example, if core 400 is executing a thread in a scouting phase, IFU 412A may fetch instructions of a thread that are to be executed in the scouting phase. IFU 412B may re-fetch instructions of that thread in parallel with IFU 412B, where the re-fetched instructions are to be subsequently executed in a non-scouting phase. In other embodiments in which core 400 includes a single IFU 412 (e.g., IFU 412A), the single IFU 412 is configured to perform both fetching and re-fetching by allocating fetch bandwidth between fetching and re-fetching instructions. In one embodiment, the IFU 412 that is re-fetching instructions is configured to re-fetch the instructions that were previously executed in the scouting phase. In some embodiments in which core 400 supports speculative execution, the IFU 412 that is re-fetching instructions is configured to re-fetch instructions executed since the last checkpoint that was taken. In various embodiments, IFUs 412 may be coupled to respective decode units that, in turn, are coupled to respective store buffers, such as those described in FIG. 3.

In one embodiment, issue unit 418 is configured to issue instructions for execution in pipeline 410. In some embodiments, issue unit 418 may be configured to operate in a similar manner as issue unit 318 described above in FIG. 3. In various embodiments, issue unit 418 is configured to issue deferred instructions from one or more deferred buffers 430 described below. (As noted above, deferred instructions are instructions that waiting for one or more operands in order to be executed or are instructions that are dependent on other deferred instructions.) In one embodiment, issue unit 418 is configured to issue a given deferred instruction from a deferred queue 430 once the data that the instruction depends upon, becomes available (e.g., is retrieved from memory).

In one embodiment, commit unit 420 is configured to cause results of instructions executed in pipeline 410 to be committed to an architectural state of the processor (i.e., retired). In some embodiments, commit unit 420 is also configured to determine whether a thread is be executed in normal phase, speculative phase, or scouting phase. In one embodiment, commit unit 420 is configured to send a pipeline clear signal to units with pipeline 410 upon core 400 ending scouting phase. In various embodiments, commit unit 420 may include trap-handling logic configured to implement various functionality of TLU 275 described above. In some embodiments, commit unit 420 may function in a similar manner as commit unit 320 described above.

In one embodiment, deferred queues (DQ) 430 are configured to store instructions that have been deferred. As noted above, in one embodiment, issue unit 418 is configured to retrieve a given instruction from a deferred queue 430 and issue it for execution once the requested operands become available for that instruction. Issue unit 418 may also issue any dependent instructions that can be executed at that time. In various embodiments, instructions issued from deferred queue 430 are executed within a separate thread—i.e., a "behind thread." In some embodiments, deferred queues 430 are configured to send an indication to commit unit 420, specifying that one or more instructions are being issued. In one embodiment, each deferred queue 430 is configured to identify the number of remaining instructions that are stored in that queue.

Once all the instructions in a given deferred queue 430 have been executed, commit unit 420, in one embodiment, is configured to perform a "commit operation" to cause the results of those deferred instructions to be committed such that architectural state is updated. In some instances, the commit operation is completed successfully. In other instances, the attempted commit operation is unsuccessful. For example, the last deferred instruction in a given deferred queue 430 may miss again and need to be re-deferred because the cacheline storing data for that instruction may have been evicted by another cacheline before that data could be used. Thus, it may not be possible to know ahead of time if a commit operation will be successful or not. As will be described below, IFUs 412 may be instructed to initiate re-fetching instructions in response to determining that a commit operation is to be attempted—e.g., when a few instructions are left in a given deferred queue 430. That way, re-fetching can be initiated before the commit operation is completed if it is successful.

Consider the following situation in which a "commit operation" is performed.

In one embodiment, core 400 may start execution in a non-speculative phase. In such a phase, all instructions are retired in order and up-date the architectural register file as well as a working register file. The DQs 430 and the speculative register files may not be used. When the first deferrable instruction is encountered, core 400, in one embodiment, takes a checkpoint of the architectural state (called the "committed checkpoint") and starts a speculative phase. In one embodiment, the deferrable instruction is placed in a first DQ 430 and its destination register is marked as not available ("NA"). Subsequent deferrable instructions may also be placed in the DQ 430 and their destination registers are marked as NA. In one embodiment, subsequent retirable instructions are executed and speculatively retired. The retirable instructions may write their results to a working register file and a speculative register file and may clear the NA bits for the destination registers.

In one embodiment, core 400 continues to execute instructions in this manner until one of the deferred instructions can be retired (e.g., the data returns for a load miss). At this point, in one embodiment, one thread of execution, called the "ahead thread", continues to fetch and execute new instructions while a separate thread of execution, called the "behind thread", starts executing the instructions from the first DQ 430. Each instruction executed by the behind thread may again be classified as being either deferrable or retirable. Deferrable instructions may be re-inserted into the same DQ from which they were read and their destination registers may be marked as NA. Retirable instructions may write their results to a working register file and may clear the NA bits for the destination registers. In addition, certain retirable instructions may also update a speculative register file and the corresponding NA bits.

At any given time, in one embodiment, the ahead thread writes the results of its retirable instructions to a current speculative register file i and places its deferrable instructions in the corresponding DQi 430. Based on policy decisions, the ahead thread, in one embodiment, can choose to take a speculative checkpoint (if the hardware resources are available) and start using the next speculative register file and DQ 430 at any time. For example, the ahead thread could detect that DQi 430 is nearly full and therefore choose to take a speculative checkpoint i and start using speculative register file i+1 and DQi+1 430. In any case, the ahead thread, in one embodiment, takes a speculative checkpoint i before the behind thread can start executing instructions from DQi 430.

At any given time, the behind thread may attempt to execute instructions from the oldest DQ 430. In particular, assuming that the oldest DQ 430 is DQi 430, the behind thread may wait until at least one of the instructions in DQi 430 can be retired, at which point the behind thread executes all of the instructions from DQi 430, redeferring them as necessary. In one embodiment, once all of the instructions in DQi 430 have been speculatively retired, the committed checkpoint is discarded, speculative register file i becomes the new committed checkpoint, and speculative register file i is freed (and can thus be used by the ahead thread when needed). As noted above, this operation may be referred to as a "commit operation."

If the ahead thread begins executing in a scouting phase prior to the commit operation being attempted, commit unit 420, in one embodiment, is configured to instruct one or more of the IFUs 412 to initiate re-fetching one or more instructions in response to determining that a commit operation is to be attempted. In one embodiment, commit unit 420 is configured to determine that a commit operation is to be attempted by receiving an indication that deferred instructions are being issued from a given deferred queue 430. As noted above, in some embodiments, the indication may specify that the number of instructions remaining in the deferred queue 430, where commit unit 420 is configured to initiate re-fetching if that number falls below a predetermined threshold. For example, if the predetermined threshold is two instructions, commit unit 420 may initiate re-fetching instructions once a given deferred queue 430 has less than two instructions. In one embodiment, the predetermined threshold may be a static value (e.g., this value may hardwired). In other embodiments, commit unit 420 may be configured to adjust this threshold in order to insure that re-fetched instruction are available to be issued upon ending the scouting phase. In various embodiments, commit unit 420 may be configured to determine that a commit operation is to be attempted based on other criteria, such as receiving an indication that a cache request for a given deferred instruction has been serviced.

By initiating re-fetching instructions in response to determining that a commit operation is to be attempted, processor 10 can begin re-fetching instructions before it ends a scouting phase. Then, in some embodiments, processor 10 can begin executing those re-fetched instructions as soon as it ends a scouting phase. Thus, processor 10 may have a smaller restart penalty than other processors that re-fetch instructions after ending a scouting phase.

A block diagram illustrating one embodiment of a method for reducing pipeline restart latency by initiating re-fetching instructions in response to determining that a commit operation is to be attempted with respect to one or more deferred instructions is described below in conjunction with FIG. 7A.

Turning now to FIG. 5, one embodiment of a processor core 500 (which may be included within processor 10 in some embodiments) configured to reduce pipeline restart latency by initiating re-fetching instructions in response to receiving an indication that a request for a set of data has been received by a cache is shown. In some instances, core 500 may have a lesser restart latency than processors that initiate re-fetching instructions after a requested set of data has been received (i.e., the cache request has been serviced).

In the illustrated embodiment, processor 10 includes a core 500 that includes an execution pipeline 510 and commit unit 520. As noted above, execution pipeline 510 is representative of circuitry that is configured to execute instructions. As shown, execution pipeline 510 includes an instruction fetch unit (IFU) 512 and memory interface unit 514 that, in turn, includes cache 530A. Processor 10 also includes a cache 530B that is external to core 500. In various embodiments, execution pipeline 410 includes one or more additional structures including an additional IFU (e.g., 512A and 512B), execution units 235 and 240, FPG 255, or other structures such as those shown within core 100 in FIG. 2. (In some embodiments, commit unit 520 may also be considered as being part of execution pipeline 510). In various embodiments, elements 512-530 may operate in a similar manner as elements 200-275 described in FIG. 2.

In one embodiment, IFU 512 is configured to fetch instructions for execution in pipeline 510. In some embodiments, core 500 includes multiple IFUs 512 that are configured to operate as primary and secondary IFUs when core 500 is operating in a scouting phase (as described in conjunction with FIG. 3). In other embodiments in which core 500 includes a shared IFU 512, that IFU 512 is configured to alternately perform both fetching and re-fetching by allocating fetch bandwidth between fetching and re-fetching instructions. In some embodiments, IFU 512 is configured to re-fetch the instructions that were previously fetched and executed but not committed. In other embodiments in which core 500 supports speculative execution, IFU 512 is configured to re-fetch instructions executed since the last checkpoint that was taken.

In one embodiment, memory interface unit 514 is configured to perform load and store operations with memory—e.g., cache memory, RAM, etc. In various embodiments, memory interface unit 514 corresponds to LSU 245 described in FIG. 2. In some embodiments, memory interface unit 514 is configured to issue a cache request to cache 530A in response to receiving a load instruction. If the request misses in cache 530A, memory interface unit 514, in one embodiment, is configured to issue a second request to cache 530B. In some embodiments, memory interface unit 514 is configured to send an indication to commit unit 520 specifying that a cache request has missed in cache 530A and/or cache 530B.

In one embodiment, caches 530A and 530B are configured to store data that may be requested by executing instructions. In one embodiment, cache 530A is an L1 that is located within core 500. In some embodiments, cache 530A corresponds to data cache 250 shown in FIG. 2. In one embodiment, cache 530B is an L2 cache that is located external to core 500. In some embodiments, cache 530B corresponds to L2 cache 105 shown in FIG. 1. In other embodiments, caches 530 may be located elsewhere and/or correspond to different cache levels—e.g., caches 530A and 530B may be L2 and L3 caches, respectively, both caches 530A and 530B may be located within core 500, etc. In one embodiment, cache 530B is configured to send an indication acknowledging that it received a cache request from memory interface unit 514. In some embodiments, cache 530B is configured to send the indication without having determined whether the requested data is available in the cache 530B or not—i.e., whether the request has produced a cache miss or a cache hit. As will be described below, commit unit 520, in some embodiments, may initiate re-fetching instructions in response to such an acknowledgment.

In one embodiment, commit unit 520 is configured to cause results of instructions executed in pipeline 510 to be committed to an architectural state of the processor (i.e., retired). In various embodiments, commit unit 520 is configured to determine whether a thread should be executed in a normal phase, a speculative phase, or a scouting phase. In some embodiments, commit unit 520 is configured to send a pipeline clear signal to units within pipeline 510 upon core 500 ending a scouting phase. In various embodiments, commit unit 520 may include trap-handling logic configured to implement various functionality of TLU 275 described above. In some embodiments, commit unit 520 may implement functionality of commit unit 320 described above.

As noted above, in one embodiment, commit unit 520 is configured to instruct IFU 512 to initiate re-fetching of instructions in response to receiving an indication that a request sent to cache 530B has been received by that cache. For example, in one embodiment, core 500 may be executing a thread in a scouting phase in response to an instruction (such as a load instruction) in that thread causing a miss in cache 530A for a set of data. Memory interface unit 514 may then send a request for the set of data to cache 530B. In response to receiving an indication that the request has been received by cache 530B, commit unit 520, in one embodiment, is configured to instruct IFU 512 to initiate re-fetching one or more instructions. In some embodiments, the instructions to be re-fetched may include the instruction that caused the miss, any dependent instructions of that instruction, other deferred instructions, etc. In one embodiment, the instructions to be re-fetched include those executed since the last checkpoint that was taken. In some embodiments, commit unit 520 is configured to cause IFU 512 to initiate re-fetching instructions by sending an indication to IFU 512, where the indication specifies that the request has been received by cache 530B. In one embodiment, commit unit 520 is configured to cause IFU 512 to initiate re-fetching instructions by sending an indication to IFU 512, where the indication specifies a program counter of a first instruction to be re-fetched.

In one embodiment, after receiving the indication acknowledging that cache 530B has received the request, commit unit 520 is configured to receive a subsequent indication identifying whether the request hit or missed in cache 530B. In some embodiments, commit unit 520 may receive this indication from cache 530B. In other embodiments, commit unit 520 may receive this indication from other sources, such memory interface unit 514. In one embodiment, if the requested data is in cache 530B (i.e., a cache hit), commit unit 520 is configured to cause core 500 to end the scouting phase and to restart pipeline 510 including initiating execution of the re-fetched instructions. In some embodiments, commit unit 520 is configured to restart pipeline 510 by sending a pipeline clear signal to one or more units in pipeline 510. In one embodiment, if the requested data is not in cache 530B (i.e., a cache miss), commit unit 520 is configured to cause core 500 to continue executing the thread in the scouting phase until commit unit 520 receives a subsequent indication that the cache request has been serviced (e.g., memory interface unit 514 has received the requested data). Once commit unit 520 has received an indication of the request being serviced, commit unit 520, in one embodiment, is configured to cause core 500 to end the scouting phase and to restart pipeline 510 including initiating execution of the re-fetched instructions.

By initiating re-fetching instructions in response to receiving an indication that a request for a set of data has been received by a cache, processor 10, in some embodiments, can end a scouting phase as soon as the requested data comes back and begin executing re-fetched instructions without having to re-fetch them. As a result, in some instances, processor 10 may have a shorter restart time than processors that initiate re-fetching instructions after a cache request has been serviced.

A block diagram illustrating one embodiment of a method for reducing pipeline restart latency by initiating re-fetching instructions in response to receiving an indication that a request for a set of data has been received by a cache is described below in conjunction with FIG. 8A.

Figure 6A:
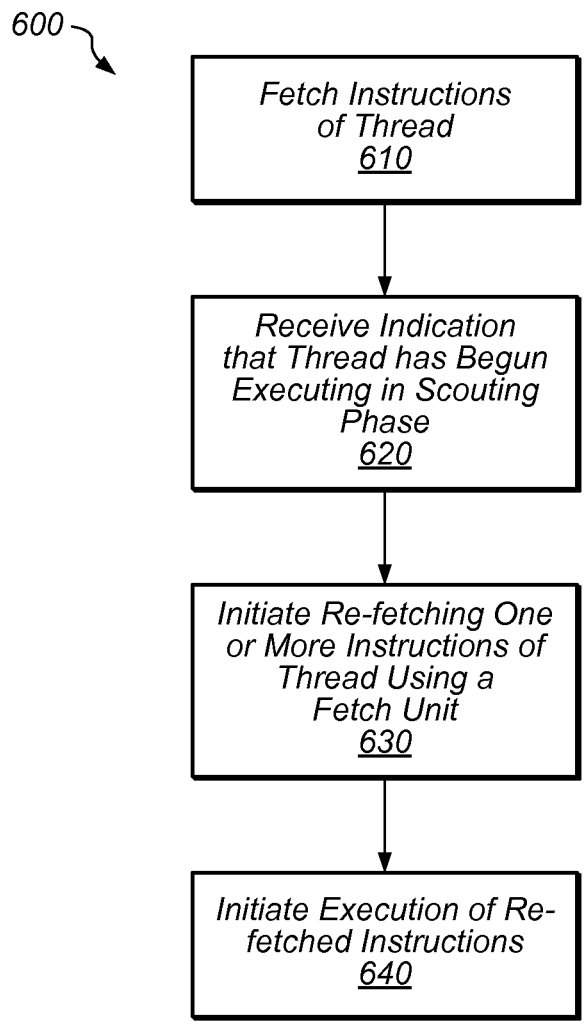
FIG. 6A is a block diagram illustrating one embodiment of a method for reducing pipeline restart latency by initiating re-fetching instructions in response to determining to execute a thread in a scouting phase.

Turning now to FIG. 6A, one embodiment of a method 600 for reducing pipeline restart latency by initiating re-fetching instructions in response to determining to execute a thread in a scouting phase is depicted. In one embodiment, processor 10 is configured to perform method 600 using multiple IFUs. In another embodiment, processor 10 is configured to perform method 600 using a single IFU that performs fetching and re-fetching. As shown, method 600 includes steps 610-640.

In step 610, an IFU (e.g., an IFU 312) of processor 10 fetches instructions of a thread. In one embodiment, processor 10 may be executing this thread in a normal phase (i.e., in a non-speculative, non-scouting phase). In other embodiments, processor 10 may be executing this thread in a speculative phase—e.g., because the thread included one or more instructions that caused one or more checkpoints. In some embodiments in which the IFU is a first of two or more IFUs (e.g., IFUs 312A and 312B), a second IFU (e.g., IFU 312B) of processor 10 may be fetching instructions for one or more other threads executing in a non-scouting phase. In various embodiments, processor may be storing instructions fetched by the IFU in an instruction buffer (e.g., instruction buffer 316).

In step 620, an IFU of processor 10 receives an indication that the thread has begun executing in a scouting phase. In one embodiment, the IFU used in step 620 may be a different IFU (e.g., IFU 312B) than the IFU (e.g., IFU 312A) used in step 610. In some embodiments, multiple IFUs may receive this indication, where the indication specifies that one of the IFUs is to perform step 630. In other embodiments, the IFU used in step 620 is the same IFU (e.g., a shared IFU 312) that is fetching instructions in step 610. (As noted above, processor 10 may enter a scouting phase for any of variety of conditions—e.g., upon detecting an additional checkpoint that is not supported in hardware, upon a deferred queue being unable to store any additional deferred instructions, upon a store queue (e.g., in LSU 245) being unable to store any additional store requests, etc.). In some embodiments, this indication is an instruction to initiate re-fetching instructions (alternately, the indication may be sent in conjunction with such an instruction). In one embodiment, this indication may specify the thread that has transitioned to executing in a scouting phase. In some embodiments, this indication may identify instructions to be re-fetched. In one embodiment, a commit unit (e.g., commit unit 320) of processor 10 sends this indication to the IFU.

In step 630, an IFU of processor 10 initiates re-fetching one or more instructions of the thread in parallel with the fetching of instructions in step 610. In one embodiment, the IFU used in step 630 may be a different IFU (e.g., IFU 312B) than the IFU (e.g., IFU 312A) used in step 610. In other embodiments, the IFU used in step 630 is the same IFU (e.g., a shared IFU 312) that is fetching instructions in step 610. In one embodiment, the IFU was previously operating in a standby mode. In another embodiment, the IFU was fetching instructions for another thread executing in a non-scouting phase. In some embodiments, the IFU re-fetches instructions that were previously fetched by the IFU used in step 610 and executed in a scouting phase. In some embodiments, the IFU re-fetches instructions executed since the last checkpoint that was taken. In one embodiment, the commit unit specifies the instructions to be re-fetched by identifying the memory address (e.g., the program counter) of the first instruction to be re-fetched. In various embodiments, instructions re-fetched by the second IFU are decoded (e.g., using decode unit 314B) and stored in an instruction buffer (e.g., instruction buffer 316B) until processor 10 ends the scouting phase. In one embodiment, the re-fetched instructions are decoded by a decode unit that is different than the decode unit that decodes instructions fetched in step 610. In some embodiments, the re-fetched instructions are stored in an instruction buffer that is different than the instruction buffer that stores instructions fetched in step 610.

In step 640, processor 10 initiates re-execution of the re-fetched instructions upon ending the scouting phase. As noted above, processor 10 may end a scouting phase upon determining that the condition that caused the processor to enter the scouting phase being resolved. In one embodiment, processor 10 initiates re-execution by sending a signal to an issue unit (e.g., issue unit 318), where the signal specifies that the issue unit is to initiate issuing instructions from the second buffer (e.g., buffer 316B) storing the re-fetched instructions. In some embodiments, the commit unit of processor 10 may send this signal as a pipeline clear signal (or in conjunction with a pipeline clear signal).

In various embodiments, processor 10 may periodically repeat method 600 as processor 10 transitions between executing threads in scouting and non-scouting phases. In some embodiments in which multiple IFUs are used, the first and second IFUs may periodically alternate roles between a primary IFU that fetches instructions for execution in scouting phase and a secondary IFU that re-fetches instructions for execution in non-scouting phase.

One example illustrating the application of method 600 is described next.

Figure 6B:
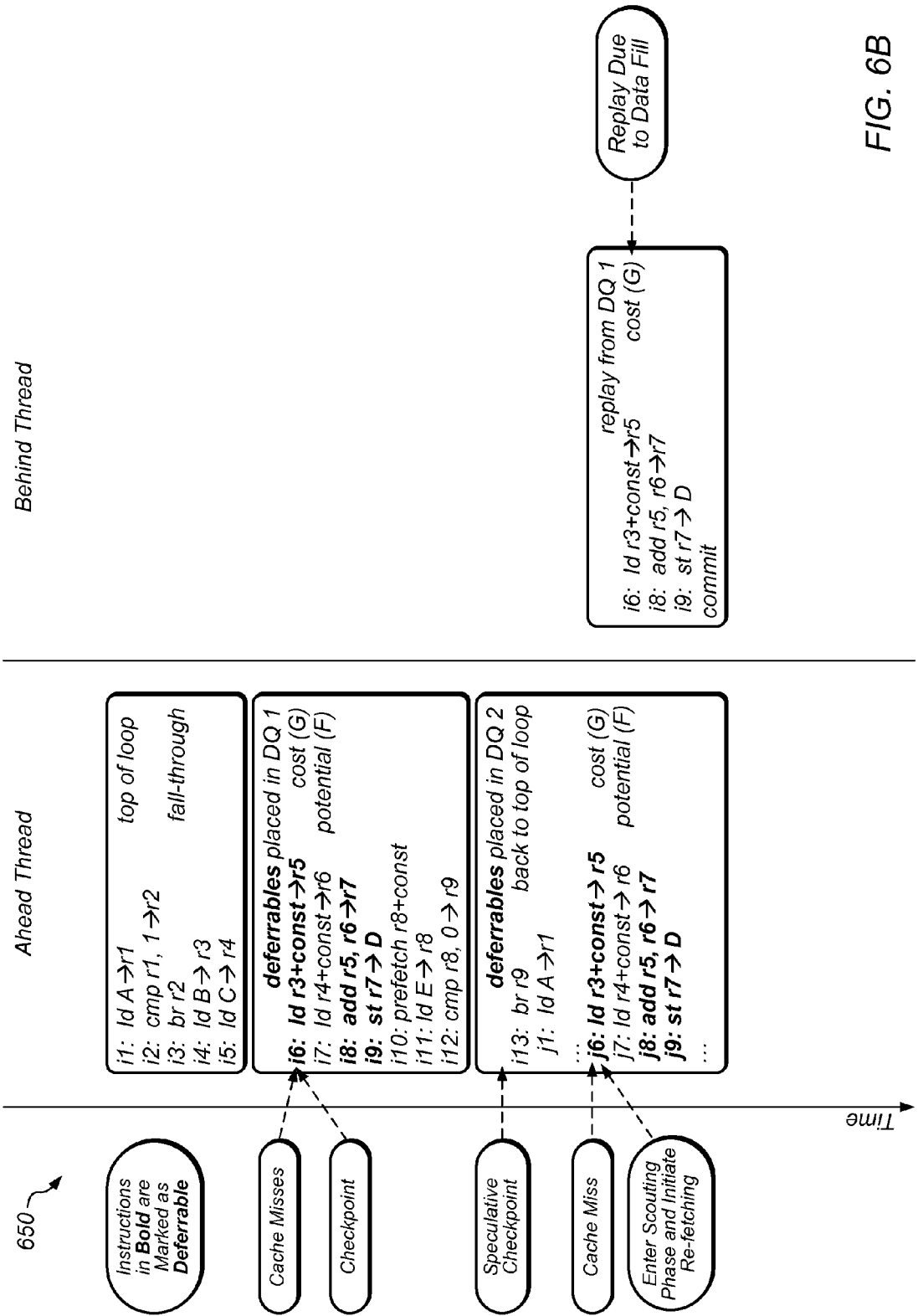
FIG. 6B is an example of reducing pipeline restart latency by initiating re-fetching instructions in response to determining to execute a thread in a scouting phase.

Turning now to FIG. 6B, an example 650 of reducing pipeline restart latency by initiating re-fetching instructions in response to determining to execute a thread in a scouting phase is depicted. In example 650, processor 10 executes a program that includes instructions that cause processor 10 to take two checkpoints and then begin executing in a scouting phase. As shown, program includes the instructions i1-j9.

The program begins with the load instruction i1 in the ahead thread that is executable to place a value into register r1. The program then includes comparison instruction i2, branch instructions i3, and two more load instructions i4 and i5. Upon executing load instruction i6, processor 10, in some embodiments, may detect a cache miss and begin speculatively executing the program within the ahead thread by taking a checkpoint. The instruction i6 and its dependent instructions i8 and i9 are then placed in a deferred queue DQ 1 to be subsequently executed within the behind thread once the cache request that caused the miss is serviced.

Program execution continues with execution of instructions i7 and i10-i12, which, in some embodiments, are only committed speculatively until execution of i6, i8, and i9 can be completed. Upon executing branch instruction i13, processor 10, in some embodiments, may take a second checkpoint and continue executing instructions based on a predicted outcome of that branch instruction. If the outcome of the branch instruction i13 is mispredicted, processor 10 can resume execution from the second checkpoint (i.e., at i13). In some embodiments, processor 10 may also begin placing any newly encountered deferred instructions in a second deferred queue DQ2.

Upon executing load instruction j6, processor 10 may detect another cache miss. In some embodiments, processor 10 transitions to executing the ahead thread in a scouting phase in response to encountering this second miss. (As noted above, processor 10 may enter a scouting phase for any of a variety of reasons. For example, DQ2 may not have sufficient space to store deferred instructions j6 and its dependent instructions j8 and j9.) From this point forward, processor 10 will continue executing instructions j6-j9 without committing their results. In one embodiment, processor 10 also initiates re-fetching instructions executed since the last checkpoint that was taken (i.e., instructions i13 onwards). As noted above, in some embodiments, these instructions are re-fetched by a second IFU of processor 10. In other embodiments, these instructions are re-fetched by a shared IFU that redirects fetch bandwidth.

In this example, when processor 10 begins execution of instruction j7 in the ahead thread, the data that instruction i6 is waiting on becomes available for use (i.e., i6's cache request has been serviced). As a result, processor 10 also begins executing instruction i6 and its dependent instructions i8 and i9 in the behind thread. In one embodiment, once processor 10 has executed instructions i6, i8, and i9, processor 10 commits the results of instructions i6-i12 and releases the resources used in taking the first checkpoint, such as DQ 1, speculative registers used to store the checkpoint, etc. In some instances, releasing those resources may resolve the condition that causes processor 10 begin executing in the scouting phase. For example, processor 10 may have begun executing in the scouting phase because it was unable to take a third checkpoint, but now that the resources have been released, it can. As a result, in some embodiments, processor 10 may end the scouting phase and begin execution of re-fetched instructions.

Figure 7A:
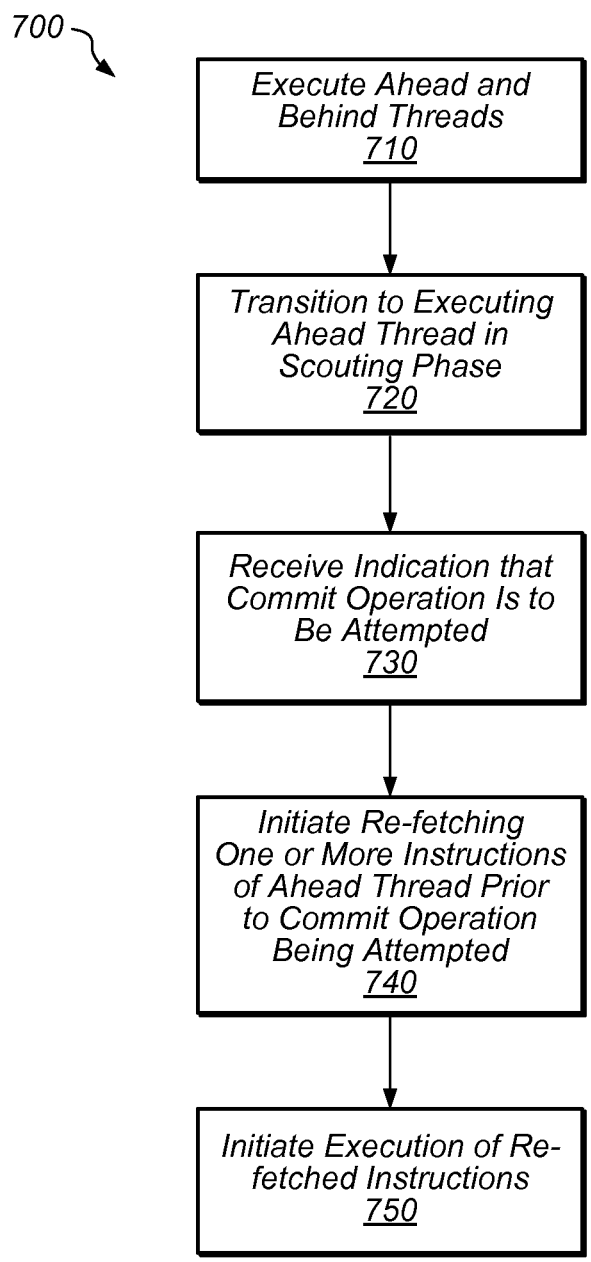
FIG. 7A is a block diagram illustrating one embodiment of a method for reducing pipeline restart latency by initiating re-fetching instructions in response to determining that a commit operation is to be attempted with respect to one or more deferred instructions.

Turning now to FIG. 7A, one embodiment of a method 700 for reducing pipeline restart latency by initiating re-fetching instructions in response to determining a commit operation is to be attempted with respect to one or more deferred instructions is depicted. As shown, method 700 includes steps 710-750.

In step 710, processor 10 executes an ahead thread and a behind thread. For example, processor 10 may execute a load instruction that causes a miss in a cache. As a result, in one embodiment, processor 10 may store the load instruction and any dependent instructions in a deferred queue to be executed within the behind thread. The non-deferred instructions may be executed within the ahead thread.

In step 720, processor 10 subsequently transitions to executing the ahead thread in a scouting phase. As noted above, processor 10 may begin executing instructions in a scouting phase for any of variety of reasons. In some embodiments, the determination to execute the ahead thread in a scouting phase is made by a control unit (e.g., commit unit 420) of processor 10.

In step 730, a control unit (e.g., commit unit 420) of processor 10 receives an indication that a commit operation is to be attempted with respect to one or more deferred instructions of the behind thread. In one embodiment, the control unit determines that a commit operation is to be attempted in response to receiving an indication specifying that deferred instructions are being issued from a deferred queue (e.g., one of deferred queues 430). In various embodiments, the control unit determines that a commit operation is to be attempted in response to the indication specifying that the number of instructions remaining in a deferred queue is below a predetermined threshold. In other embodiments, the control unit may determine that a commit operation is to be attempted in response to other criteria such as receiving an indication specifying a cache has serviced requests for one or more of the deferred instructions stored in the deferred queue.

In step 740, the control unit initiates, prior to the commit operation being attempted, fetching one or more instructions of the ahead thread that were previously fetched while processor 10 was executing the ahead thread in the scouting phase. In one embodiment, if the instructions were previously fetched by a first IFU (e.g., IFU 412A) of processor 10, the control unit initiates re-fetching those instructions using a second IFU (e.g., IFU 412B) different from the first IFU, where the second IFU fetches instructions in parallel with the first IFU. In other embodiments, the same IFU may perform both fetching and re-fetching. In some embodiments, the IFU re-fetches instructions executed since the last checkpoint that was taken. In one embodiment, the control unit may specify the instructions to be re-fetched by identifying the thread that is executing in the scouting phase. In some embodiments, the control unit may specify the instructions to be re-fetched by identifying the memory address (e.g., the program counter) of the first instruction to be re-fetched. In various embodiments, step 740 may be performed in a similar manner as step 630 described above.

In step 750, processor 10 initiates execution of the re-fetched instructions after processor 10 performs the commit operation and ends the scouting phase. As noted above, processor 10 may end a scouting phase when the condition that caused the processor to enter the scouting phase is resolved. In some embodiments, step 750 may be performed in a similar manner as step 640 described above.

One example illustrating the application of method 700 is described next.

Turning now to FIG. 7B, an example 760 of reducing pipeline clear latency by re-fetching instructions in response to determining that a commit operation is to be attempted with respect to one or more deferred instructions is depicted. In example 760, processor 10 executes a program that includes instructions that cause processor 10 to take two checkpoints and then begin executing in a scouting phase. As will be described, processor 10 may re-fetch instructions upon determining that a commit operation is to be attempted.

Program execution begins with processor executing instructions i1-i5. Upon executing load instruction i6, processor 10, in some embodiments, detects a cache miss and takes a first checkpoint. At this point, in one embodiment, processor 10 places the instruction i6 and its dependent instructions i8 and i9 in a deferred queue DQ 1 to be subsequently executed within a behind thread once the cache request that caused the miss is serviced. Processor 10 continues to execute the non-deferred instructions i7 and i10-12 in the ahead thread.

Upon executing branch instruction i13, processor 10, in one embodiment, may take a second checkpoint and continue executing instructions based on the predicted outcome of that branch instruction. As noted above, if the outcome of the branch instruction i13 is mispredicted, processor 10 can resume execution from the second checkpoint. In some embodiments, processor 10 may also begin placing any newly encountered deferred instructions in a second deferred queue DQ2.

Upon executing load instruction j6, processor 10 may detect another cache miss and transition to executing the ahead thread in scouting phase. From this point forward, processor 10 executes instructions j6-j9 without committing their results.

In this example, when processor 10 begins execution of instruction j7 in the ahead thread, the data on which instruction i6 is waiting becomes available for use (i.e., i6's cache request has been serviced). As a result, processor 10 retrieves instruction i6 from deferred queue DQ1 and begins executing it in the behind thread. Dependent instructions i8 and i9, however, remain stored in DQ1. In one embodiment, in response to DQ1 having to two or less instructions, processor 10 initiates re-fetching instructions executed since the last taken checkpoint (i.e., instructions i13 onwards). After processor 10 has executed instructions i6, i8, and i9, processor 10 may perform a commit operation and end the scouting phase. At that point, processor 10 may initiate execution of the re-fetched instructions.

Figure 8A:
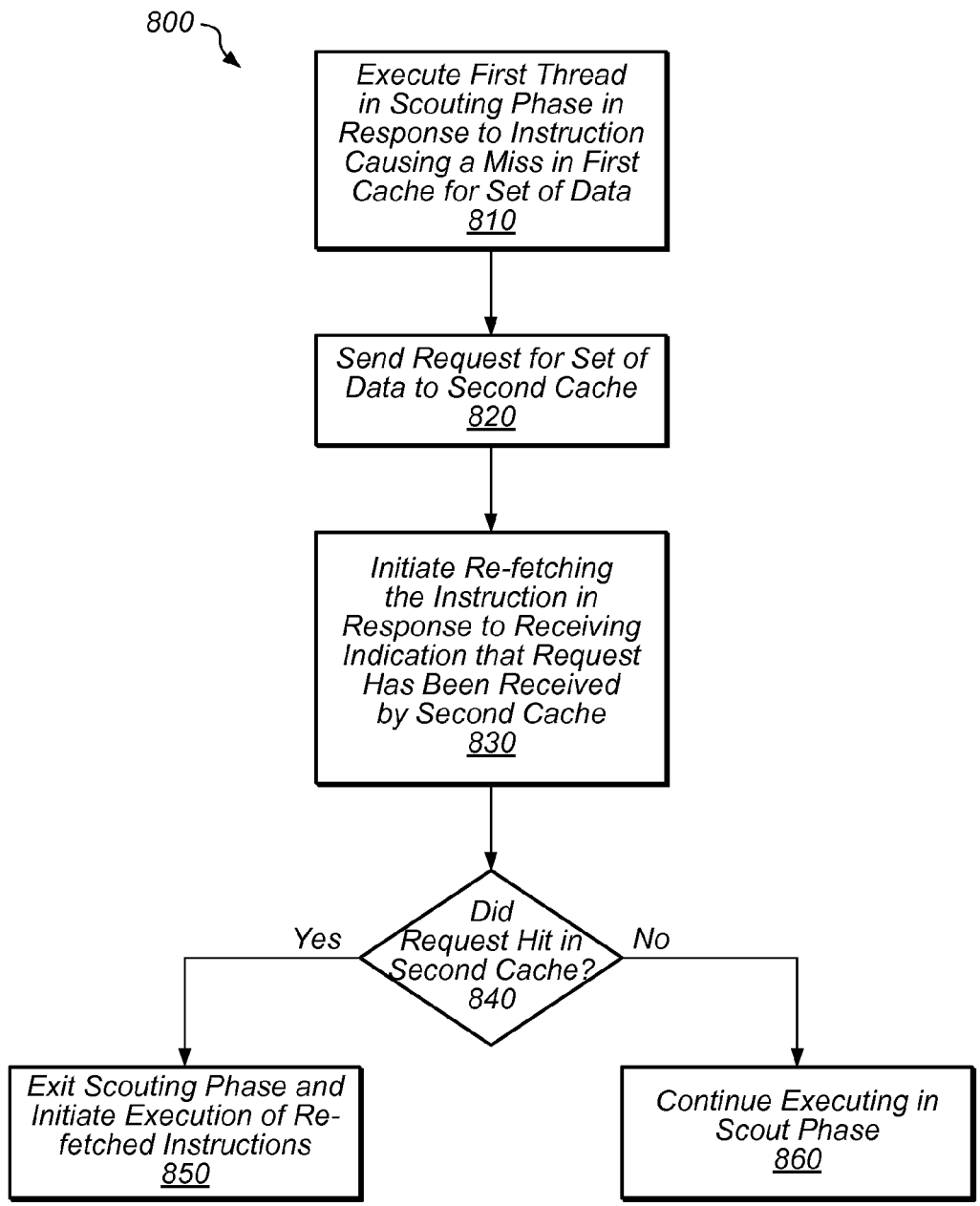
FIG. 8A is a block diagram illustrating one embodiment of a method for reducing pipeline restart latency by initiating re-fetching instructions in response to receiving an indication that a request for a set of data has been received by a cache.
Figure 9:
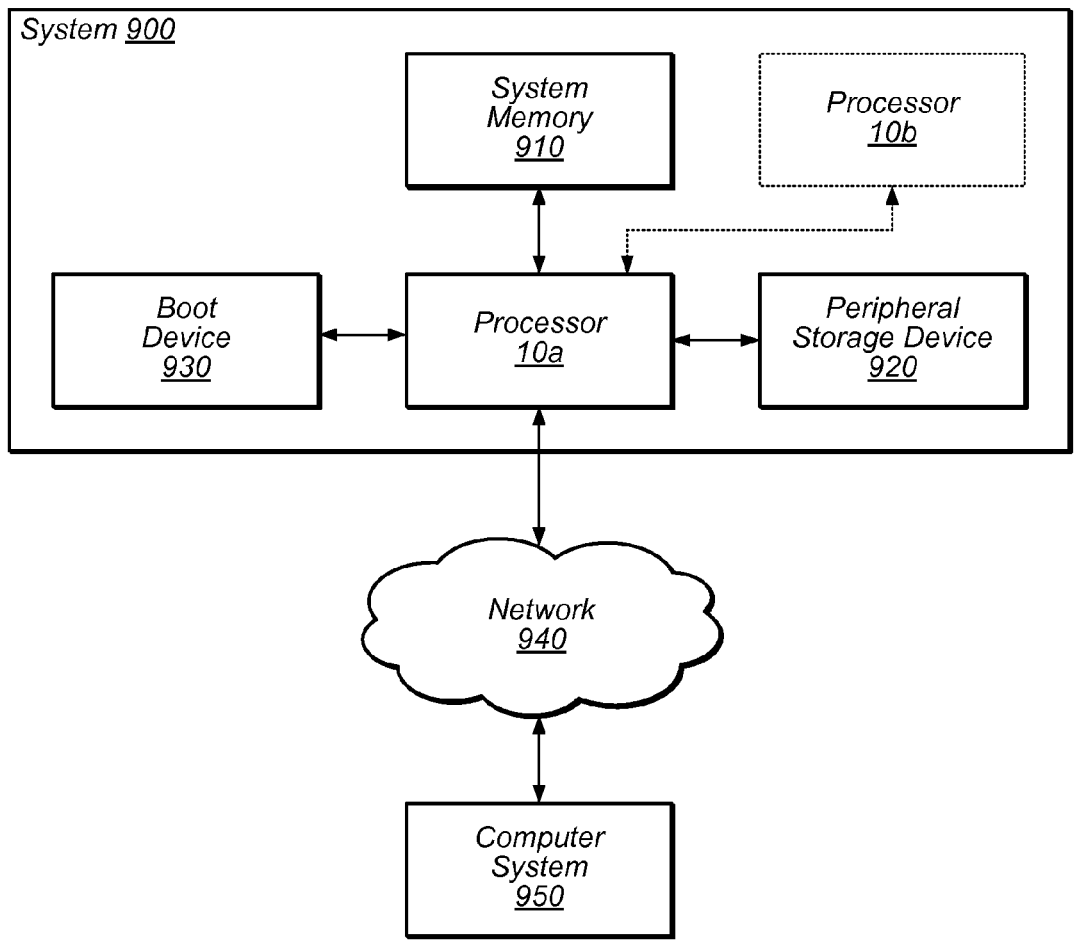
FIG. 9 is a block diagram of one embodiment of a computer system.

Turning now to FIG. 8A, one embodiment of a method 800 for reducing pipeline restart latency by initiating re-fetching instructions in response to receiving an indication that a request for a set of data has been received by a cache is depicted. As shown method 800 includes steps 810-860.

In step 810, processor 10 executes a thread in a scouting phase in response to an instruction (e.g., a load instruction) in the thread causing a miss in a cache (e.g., cache 530A) for a set of data. As noted above, processor 10 may be begin executing a thread in a scouting phase for a variety of reasons. In some embodiments, a commit unit (e.g., commit unit 520) of processor 10 is configured to determine whether the thread is to be executed in a scouting phase and to cause processor 10 to transition to executing a thread in the scouting phase.

In step 820, a memory interface unit (e.g., memory interface unit 514) of processor 10 sends a request for the set of data to a second cache (e.g., cache 530B) in response to the miss in the first cache. In one embodiment, in response to receiving the request, the second cache responds by sending an indication acknowledging receipt of the request before determining whether the request has hit or missed. In some embodiments, the second cache sends this indication to the commit unit of processor 10—e.g., directly or via the memory interface unit of processor 10. In one embodiment, the commit unit sends a corresponding indication to an IFU of processor 10.

In step 830, the IFU (e.g., IFU 512) of processor 10 initiates re-fetching the instruction that caused the miss in response to receiving an indication that the request has been received by the second cache, where the IFU begins the re-fetching prior to the second cache completing the request. In one embodiment, the IFU that is re-fetching instructions is also fetching instructions for the thread that is executing in the scouting phase. In other embodiments, processor 10 uses a first IFU as a primary IFU to fetch instructions that are to be executed in the scouting phase and uses a second IFU to re-fetch instructions in parallel with the first IFU, where the re-fetched instructions include the instruction that caused the miss. In one embodiment, the IFU may re-fetch additional instructions that were previously fetched and executed but not committed (e.g., those fetched by the first IFU and executed in the scouting phase). In some embodiments, the IFU may re-fetch instructions executed since the last checkpoint that was taken. In one embodiment, the commit unit may specify the instructions to be re-fetched by identifying the thread that is executing in the scouting phase. In some embodiments, the commit unit may specify the instructions to be re-fetched by identifying the memory address (e.g., the program counter) of the first instruction to be re-fetched—e.g., the instruction that caused the miss. In various embodiments, step 740 may be performed in a similar manner as step 630 described above.

In step 840, a commit unit (e.g., commit unit 520) of processor 10 receives an indication specifying whether the request for the set of data hit or missed in the second cache. In one embodiment, the commit unit receives this indication from the second cache (e.g., cache 530B). In another embodiment, the commit unit recites this indication from a memory interface unit (e.g., memory interface unit 514) of processor 10. If the request hit in the cache, method 800 proceeds to step 850. Otherwise, method 800 proceeds to step 860.

In step 850, processor 10 ends the scouting phase and initiates execution of the re-fetched instructions in response to the request hitting in the second cache. In some embodiments, step 840 may be performed in a similar manner as step 640 described above.

In step 860, processor 10 continues to execute the thread in the scouting phase until it receives an indication that the request has been serviced. At that point, in one embodiment, processor 10 ends the scouting phase and initiates execution of the re-fetched instructions.

One example illustrating the application of method 800 is described next.

Figure 8B:
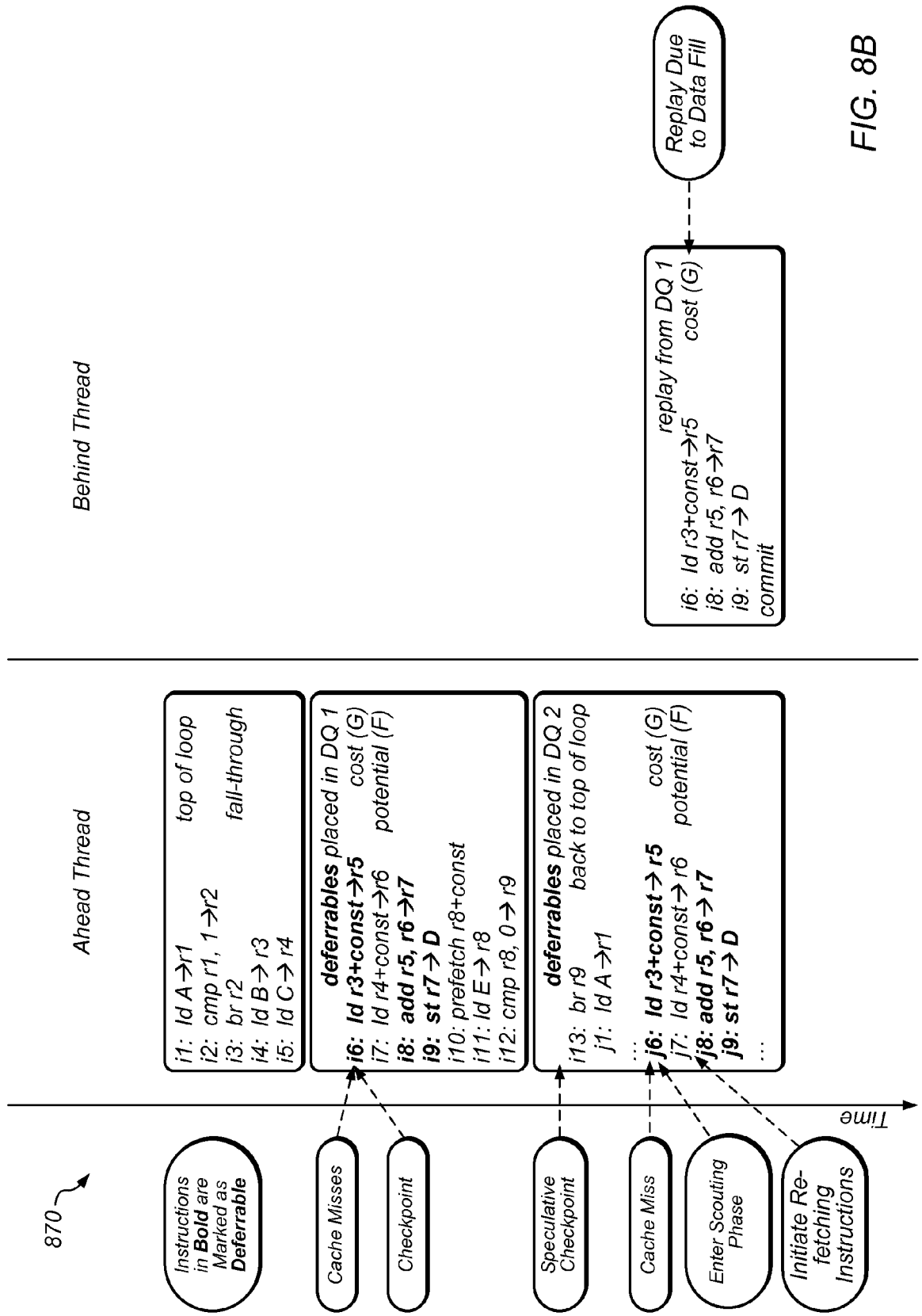
FIG. 8B is an example of reducing pipeline restart latency by initiating re-fetching instructions in response to receiving an indication that a request for a set of data has been received by a cache.

Turning now to FIG. 8B, an example 870 of reducing pipeline restart latency by initiating re-fetching instructions in response to receiving an indication that a request for a set of data has been received by a cache is depicted. In example 870, processor 10 executes a program that includes instructions that cause processor 10 to take two checkpoints and then begin executing in a scouting phase. As will be described, processor 10 may re-fetch instructions upon receiving an acknowledgment indicating that a request for a set of data has been received by a cache.

Program execution begins with processor executing instructions i1-i5. Upon executing load instruction i6, processor 10, in some embodiments, detects a cache miss and takes a first checkpoint. At this point, in one embodiment, processor 10 places the instruction i6 and its dependent instructions i8 and i9 in a deferred queue DQ 1 to be subsequently executed within a behind thread once the cache request that caused the miss is serviced. Processor 10 continues to execute the non-deferred instructions i7 and i10-12 in the ahead thread.

Upon executing branch instruction i13, processor 10, in one embodiment, may take a second checkpoint and continue executing instructions based on the predicted outcome of that branch instruction. As noted above, if the outcome of the branch instruction i13 is mispredicted, processor 10 can resume execution from the second checkpoint. In some embodiments, processor 10 may also begin placing any newly encountered deferred instructions in a second deferred queue DQ2.

Upon executing load instruction j6, processor 10 may detect another cache miss in a first cache of processor 10 (e.g., cache 530A) and transition to executing the ahead thread in a scouting phase. In response to this miss in the first cache, processor 10, in one embodiment, sends a second request to a second cache (e.g., cache 530B) that is configured to acknowledge receipt of the request.

In this example, when processor 10 begins execution of instruction j7 in the ahead thread, processor 10, in one embodiment, receives the acknowledgement from the second cache indicating that it has received the request for load instruction j6. (In other embodiments, processor 10 may, of course, receive this acknowledgment at a later (or earlier) point.) In response to receiving the acknowledgment, processor 10, in one embodiment, initiates re-fetching instructions executed since the last taken checkpoint (i.e., instructions i13 onwards). After processor 10 has committed the results of instructions i6, i8, and i9, processor 10, in one embodiment, may end the scouting phase and initiate execution of the re-fetched instructions.

Exemplary System Embodiment

As described above, in some embodiments, processor 10 of FIG. 1 may be configured to interface with a number of external devices. One embodiment of a system including processor 10 is illustrated in FIG. 9. In the illustrated embodiment, system 900 includes an instance of processor 10, shown as processor 10a, that is coupled to a system memory 910, a peripheral storage device 920 and a boot device 930. System 900 is coupled to a network 940, which is in turn coupled to another computer system 950. In some embodiments, system 900 may include more than one instance of the devices shown. In various embodiments, system 900 may be configured as a rack-mountable server system, a standalone system, or in any other suitable form factor. In some embodiments, system 900 may be configured as a client system rather than a server system.

In some embodiments, system 900 may be configured as a multiprocessor system, in which processor 10a may optionally be coupled to one or more other instances of processor 10, shown in FIG. 9 as processor 10b. For example, processors 10a-b may be coupled to communicate via their respective coherent processor interfaces 160.

In various embodiments, system memory 910 may comprise any suitable type of system memory as described above, such as FB-DIMM, DDR/DDR2/DDR3/DDR4 SDRAM, or RDRAM®, for example. System memory 910 may include multiple discrete banks of memory controlled by discrete memory interfaces in embodiments of processor 10 that provide multiple memory interfaces 130. Also, in some embodiments, system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 920 may be coupled to processor 10 via peripheral interface(s) 150 of FIG. 1.

As described previously, in one embodiment boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc. In some embodiments, processor 10 may be configured to communicate with network 940 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   a first instruction fetch unit configured to initiate re-fetching instructions of a thread in response to receiving a first indication that the thread has begun executing in a scouting phase; and
   wherein the first instruction fetch unit is configured to re-fetch one or more of the instructions of the thread in response to a second indication that the scouting phase is ending, wherein the first instruction fetch unit is configured to re-fetch the one or more instructions while the processor fetches and executes instructions in the scouting phase, and wherein the processor is configured to execute the re-fetched one or more instructions after the scouting phase ends.

2. The processor of claim 1, wherein the first instruction fetch unit is configured to alternate between fetching instructions of the thread that are to be executed in the scouting phase and the re-fetching of the instructions of the thread that are to be executed after the scouting phase ends.

3. The processor of claim 1, further comprising:
   a second instruction fetch unit configured to operate in parallel with the first instruction fetch unit and to fetch instructions of the thread that are to be executed during the scouting phase.

4. The processor of claim 3, further comprising:
   a first instruction buffer configured to store the one or more instructions re-fetched by the first instruction fetch unit, wherein the processor is configured to execute the re-fetched one or more instructions stored in the first instruction buffer after receiving an indication that the thread has stopped executing in the scouting phase; and
   a second instruction buffer distinct from the first instruction buffer, wherein the second instruction buffer is configured to store instructions fetched by the second instruction fetch unit.

5. The processor of claim 3, wherein the processor is configured to execute the re-fetched one or more instructions upon the processor ending the scouting phase; and
   wherein the second instruction fetch unit is configured to:
   receive an indication specifying that the thread has begun executing in another scouting phase; and
   in response to receiving the indication specifying that the thread has begun executing in the other scouting phase, re-fetch one or more additional instructions of the thread.

6. The processor of claim 1, further comprising:
   a commit unit configured to provide the first indication to the first instruction fetch unit in response to determining that the thread is to be executed in the scouting phase, and wherein the first indication includes a program counter of a first instruction of the one or more instructions of the thread to be re-fetched.

7. The processor of claim 1, further comprising:
   a deferred queue that is configured to store up to N instructions, including a load instruction that causes a checkpoint to be taken by the processor and further including one or more dependent instructions of the load instruction, wherein the processor is configured to execute the thread in the scouting phase in response to the deferred queue storing N instructions; and
   wherein the processor is configured to retrieve the load instruction from the deferred queue and to issue the load instruction upon receiving an indication that a cache request of the load instruction has been serviced.

8. A processor, comprising:
   a first instruction fetch unit configured to fetch instructions for execution;
   a control unit;
   wherein the processor is configured to execute instructions for an ahead thread and a behind thread, and wherein the processor is configured to initiate executing the ahead thread in a scouting phase in response to a deferred instruction of the behind thread;
   wherein the control unit is configured to receive an indication that a commit operation is to be attempted with respect to the deferred instruction; and
   wherein the control unit is configured to cause, in response to the indication prior to the commit operation being attempted, fetching one or more instructions of the ahead thread that were previously fetched while the processor was executing the ahead thread in the scouting phase, wherein the processor is configured to fetch the previously fetched one or more instructions while the processor executes the ahead thread, and wherein the processor is configured to execute the previously fetched one or more instructions after the scouting phase ends.

9. The processor of claim 8, further comprising:
   a deferred queue configured to store one or more deferred instructions including the deferred instruction; and
   wherein the control unit is configured to cause fetching of the previously fetched one or more instructions of the ahead thread in response to the received indication specifying that at least one of the deferred instruction is being removed from the deferred queue for execution.

10. The processor of claim 9, wherein the received indication further specifies a number of instructions remaining in the deferred queue, and wherein the control unit is configured to cause fetching the previously fetched one or more instructions of the ahead thread in response to the number of instructions being below a predetermined threshold.

11. The processor of claim 8, wherein the processor is configured to execute the ahead thread in the scouting phase by executing instructions fetched by the first instruction fetch unit, and wherein the control unit is configured to cause fetching the previously fetched one or more instructions of the ahead thread by instructing the first instruction fetch unit to re-fetch the previously fetched one or more instructions of the ahead thread.

12. The processor of claim 8, further comprising:
a second instruction fetch unit; and
wherein the processor is configured to execute the ahead thread in the scouting phase by executing instructions fetched by the first instruction fetch unit, and wherein the control unit is configured to cause fetching the previously fetched one or more instructions of the ahead thread by instructing the second instruction fetch unit to re-fetch the previously fetched one or more instructions of the ahead thread.

13. The processor of claim 8, wherein the control unit is configured to cause the processor to execute the fetched one or more instructions after the commit operation is performed.

14. The processor of claim 8, wherein the control unit is configured to cause fetching the previously fetched one or more instructions by providing an indication that includes a program counter to the first instruction fetch unit.

15. A processor, comprising:
a first instruction fetch unit; and
a memory interface unit;
wherein the processor is configured to execute a thread in a scouting phase in response to execution of a fetched instruction in the thread causing a miss in a first cache for a set of data;
wherein the memory interface unit is configured to send, in response to the miss in the first cache, a request for the set of data to a second cache; and
wherein the first instruction fetch unit is configured to re-fetch the instruction in response to receiving an indication that the request has been received by the second cache, and wherein the first instruction fetch unit is configured to re-fetch the instruction prior to the second cache completing the request and while the processor executes the thread in the scouting phase, wherein the processor is configured to execute the re-fetched instruction after the scouting phase ends.

16. The processor of claim 15, wherein the processor is configured to execute the re-fetched instruction in response to receiving the requested set of data from the second cache, and wherein the processor is configured to continue executing the thread in the scouting phase in response to receiving an indication that the set of data has missed in the second cache.

17. The processor of claim 15, further comprising:
a commit unit configured to determine whether the thread is to be executed in the scouting phase and to send the indication to the first instruction fetch unit in response to receiving information specifying that the request has been received by the second cache.

18. The processor of claim 17, wherein the indication specifies a memory address at which the instruction is stored, and wherein the first instruction fetch unit is configured to re-fetch the instruction from the specified memory address.

19. The processor of claim 15, further comprising:
a plurality of processing cores; and
wherein the first cache is located within a first of the plurality of processing cores, and wherein the second cache is located externally to the first processing core.

20. The processor of claim 15, further comprising:
a second instruction fetch unit; and
wherein the processor is configured to execute the thread in the scouting phase by executing instructions fetched by the second instruction fetch unit; and
wherein the first and second instruction fetch units are configured to operate in parallel.

21. A method, comprising:
an instruction fetch unit of processor receiving an indication that a thread has begun executing in a scouting phase; and
in response to the received indication, the instruction fetch unit re-fetching instructions of the thread in response to an indication that to the thread is ending the scouting phase, wherein the instruction fetch unit re-fetches one or more of the instructions while the processor fetches and executes instructions in the scouting phase, and wherein the processor is configured to execute the one or more instructions after the scouting phase ends.

* * * * *

UNITED STATES PATENT AND TRADEMARK OFFICE
CERTIFICATE OF CORRECTION

PATENT NO. : 9,086,889 B2  Page 1 of 1
APPLICATION NO. : 12/768641
DATED : July 21, 2015
INVENTOR(S) : Karlsson et al.

It is certified that error appears in the above-identified patent and that said Letters Patent is hereby corrected as shown below:

In the specification,

In column 15, line 61, delete "checking" and insert -- checking. --, therefor.

In column 15, line 66, delete "checking" and insert -- checking. --, therefor.

In column 20, line 52, delete "note" and insert -- noted --, therefor.

In column 24, line 3, delete "thread is be" insert -- thread is to be --.

In the claims,

In column 38, line 39, in claim 21, after "that" delete "to".

Signed and Sealed this
Seventeenth Day of May, 2016

Michelle K. Lee
*Director of the United States Patent and Trademark Office*